United States Patent [19]
Koreeda et al.

[11] Patent Number: 5,637,932
[45] Date of Patent: Jun. 10, 1997

[54] POWER CONSUMPTION CONTROL SYSTEM

[75] Inventors: Hiroyuki Koreeda; Tadashi Kuwabara, both of Yokohama; Naomichi Nonaka, Kawasaki; Keiichi Nakane, Yokohama; Shigeki Taniguchi, Hitachi, all of Japan

[73] Assignee: Hitachi, Ltd., Tokyo, Japan

[21] Appl. No.: 460,925

[22] Filed: Jun. 5, 1995

Related U.S. Application Data

[62] Division of Ser. No. 798,891, Nov. 27, 1991.

[30] Foreign Application Priority Data

Nov. 27, 1990 [JP] Japan ................................. 2-324144
Nov. 28, 1990 [JP] Japan ................................. 2-331155

[51] Int. Cl.$^6$ ........................................... H01H 43/00
[52] U.S. Cl. .................... 307/125; 307/116; 364/273; 364/273.1; 364/273.2; 364/273.3; 364/273.4; 364/273.5; 364/707; 365/229
[58] Field of Search ........................ 307/125, 116; 364/292, 707, 273, 273.1, 273.2, 273.3, 273.4, 273.5; 365/229

[56] References Cited

U.S. PATENT DOCUMENTS

| | | | |
|---|---|---|---|
| 4,481,440 | 11/1984 | Yonezu et al. | 364/200 |
| 5,189,647 | 2/1993 | Suzuki et al. | 368/10 |
| 5,222,239 | 6/1993 | Rosch . | |

FOREIGN PATENT DOCUMENTS

| | | |
|---|---|---|
| 63-175910 | 7/1988 | Japan . |
| 1-66719 | 3/1989 | Japan . |
| 1-205220 | 8/1989 | Japan . |

*Primary Examiner*—William M. Schoop, Jr.
*Assistant Examiner*—Albert W. Paladini
*Attorney, Agent, or Firm*—Antonelli, Terry, Stout & Kraus

[57] ABSTRACT

A power consumption control apparatus for an information processing apparatus having multi-tasking control which executes a plurality of information processing operations in parallel by time-divisionally switching a plurality of tasks in an arithmetic processing unit. The power consumption controlled apparatus detects an event where there are no information processing operations to be executed, sets the arithmetic processing unit to a power-saving mode in response to the event and immediately clears the power-saving mode set in the arithmetic processing unit in response to an interrupt signal from an input/output device. Alternatively, the power consumption control apparatus after detecting the event stops supply of a clock to the arithmetic processing unit or lowers a frequency of the clock in response to the event. Thereafter, the power consumption control apparatus immediately resumes supply of the clock to the arithmetic processing unit or raises the frequency of the clock in response to an interrupt signal from an input/output device.

9 Claims, 19 Drawing Sheets

TASK MANAGEMENT TABLE

INPUT/OUTPUT REQUEST MANAGEMENT TABLE

TIMER MANAGEMENT TABLE

RESOURCE DEVICE MANAGEMENT TABLE

| RESOURCE NUMBER \ DEVICE NUMBER | #0 (DMAC) | #1 (SCC1) | #2 (KB) | #3 (SCC2) | #4 (SCC3) | #5 (FDC) | #6 (FDD) | #8 (VRAM) | #9 (LCDC) | #10 (LCD) | #11 (BL) | #12 (PRC) |
|---|---|---|---|---|---|---|---|---|---|---|---|---|
| #0 (FLOPPY DISK) | 1 | 0 | 0 | 0 | 0 | 1 | 1 | 0 | 0 | 0 | 0 | 0 |
| #1 (KEYBOARD) | 0 | 0 | 1 | 0 | 0 | 0 | 0 | 0 | 0 | 0 | 0 | 0 |
| #2 (COMMUNICATION) | 1 | 1 | 0 | 1 | 0 | 0 | 0 | 0 | 0 | 0 | 0 | 0 |
| #3 (IMAGE SCANNER) | 1 | 0 | 0 | 0 | 1 | 0 | 0 | 0 | 0 | 0 | 0 | 0 |
| #4 (PRINTER) | 0 | 0 | 0 | 0 | 0 | 0 | 0 | 0 | 0 | 0 | 0 | 1 |
| #5 (DISPLAY) | 0 | 0 | 0 | 0 | 0 | 0 | 0 | 1 | 1 | 1 | 1 | 0 |

DEVICE MANAGEMENT TABLE

- 151 CLOCK STOP FLAG
- 152 POWER STOP FLAG
- 153 TIME-OUT FLAG
- 154 TIME-OUT PERIOD
- 155 CLOCK STATUS
- 156 POWER STATUS

POWER CONSUMPTION CONTROL SYSTEM

This is a divisional application of Ser. No. 07/798,891 filed Nov. 27, 1991.

BACKGROUND OF THE INVENTION

1. Field of the Invention

The present invention relates to the power supply capability for an information processing apparatus and in particular to a power consumption control system for reducing the power consumption in an information processing apparatus under actual working conditions.

2. Description of the Related Art

Electronic equipment such as word processors and personal computers, which have been miniaturized, are supplied with their necessary power from a built-in battery to provide the equipment with portability and mobility. However, the amount of power stored in the built-in battery is limited. Accordingly, it is necessary to suppress the power consumption of the electronic equipment to assure a practical period of operation time. For this purpose, some electronic devices have the capability to suppress the power consumption by turning off the power to the disk drive apparatus if a new access is not made within a predetermined time period from the last access.

The predetermined monitor time can be preset by the user.

Specifically, the power consumption control systems are disclosed in Japanese Patent Application Laid-Open (KOKAI) Sho 64-66719 and OA Personal Computer, Aug. 1990, pages 45 to 47.

In these systems, reduction of power consumption is achieved by constantly monitoring the entry from a keyboard and sequentially turning off power sources for devices which are not used in an apparatus.

For example, if there has been no key entry for a given period of time (several seconds to several tens of minutes), processing is stopped by firstly stopping the supply of clock to a CPU (micro processor). If there has been no key entry for a further given period of time (several minutes to several tens of minutes), a backlight of a liquid crystal display is turned off. If there has been no key entry for an even further given period of time, the display itself is also turned off.

Reduction of power consumed by the floppy disk drive or the hard disc drive is achieved by monitoring the use of the disk drive by means of an exclusive CPU and automatically stopping a motor for the drive if there has been no access thereto for a given period of time (several seconds).

Many of the CPUs or peripheral devices which are to be controlled use all internal registers including static CMOS transistors.

The reason for this will now be described.

Although the power consumption of the LSI increases in proportion to the frequency of clock supplied to the LSI, there is a lower limit of the frequency of the operative clock even if the clock frequency is lowered to reduce the power consumption in the case of dynamic LSI. If dynamic LSI is operated at a frequency lower than the minimum frequency, the contents in the internal registers are lost so that normal operation cannot be performed. On the other hand, in case of static LSI, the contents of the internal registers are not lost, if the supply of clock is stopped. Accordingly, power consumption of the static LSI can be remarkably reduced by appropriately stopping the clock supply when the clock supply is deemed unnecessary.

The CMOS type LSI has characteristics whereby little current flows therethrough if a clock is not supplied to the LSI even when power is supplied to the LSI. The reduction in power consumption is remarkable when the clock supply is stopped.

In order to easily achieve control of the clock supply to the CPU, many CPUs are provided with a command for stopping the supply of the clock (referred to as a "sleep" command) and with a capability to resume the supply of the clock to the CPU in response to an externally provided interrupt signal.

Since a period of time until the supply of power is turned off is constant irrespective of the operating conditions of the equipment in the prior art, the power consumption is increased due to resuming operation in response to an access immediately after the supply of power is turned off if an inappropriate monitor time is set. This problem is serious particularly in equipment requiring a lot of power for activation such as a disc drive apparatus.

In order to avoid such a problem, it is necessary for the user to change the setting of the monitor time depending upon the condition of use of the disk apparatus. This places too high a burden on the users. Appropriate setting is not easy and optimum reduction in power consumption cannot be achieved.

The above mentioned prior art power saving techniques can achieve a remarkable power saving if the user does not use an information processing apparatus, for example, if there has been not key entry for a given period of time or the disk has not been accessed for a given period of time.

However, presence or absence of a key entry is not inherently related to the conditions of use of the peripheral devices or the CPU. These power saving techniques assume that the whole information processing apparatus is not used if there has been no key entry for a while and merely sequentially restrict the supply of power.

The prior art product assumes that a usual application program will not last for several tens of minutes since the termination of the supply of clock to a CPU is stopped if there has been no key entry for several tens of seconds. This may interrupt the processing of some application programs which use the CPU for a long period of time.

The prior art power saving technique is rarely invoked when application programs such as word processing, communication and table calculation are actually executed while the user carries out key entry. Accordingly, power saving is less when in actual use by the user.

SUMMARY OF THE INVENTION

It is an object of the present invention to provide a system for controlling the power consumption, which is capable of reducing the power consumption without lowering the processing speed as viewed by a user when in actual use by the user.

It is another object of the present invention to provide an information processing apparatus, a disk drive apparatus and a power source monitoring apparatus, etc., which are capable of automatically changing the period of time until the supply of power is turned on or off depending upon the operating conditions of the equipment.

Another object of the present invention is to realize a power consumption control method which, when the system for reducing power consumption controls by the characteristics of each type of hardware device, minimizes the change of power consumption control, or an information processing device comprising a power consumption controlling method.

In order to accomplish the above mentioned object, the information processing apparatus of the present invention treats as logical resources groups of components implementing a series of processing steps. The present invention is capable of managing the operating conditions of the resources, by holding information on the corresponding relation between each resource and the components which are related therewith, and on the power control of each component. The system then commences the supply of power to a component if the supply of power to the component is stopped when use of its associated resource is required by a certain processing operation and stops the supply of power to a component if the component related with a resource is not used when use of the resource is terminated.

A given period of time which is predetermined for each of the components is measured and after the lapse of a given period of time, the supply of power to the particular component is stopped.

When the use of the component is re-commenced within the given period of time, the measurement of time is terminated.

A subject to be controlled includes clock and power.

Specifically, the present invention comprises at least one of a first power saving means which supplies and stops clocking and a second power saving means which supplies and stops power.

The first power saving means includes clock supply control means for controlling the supply of clock to individual components of the information processing apparatus; clock supply stopping means for determining whether or not it is possible to stop the clock supply to the component when the component is brought into an unused condition and for instructing the clock supply control means to stop the clock supply to the component if it is determined that it is possible; clock supply commencing means for instructing the clock supply control means to commence the clock supply to a component when the component to which clock supply has been stopped is brought into a used condition; the second power saving means includes power supply control means for controlling supply of power to individual components of the information processing apparatus; power supply stopping means for determining whether or not the power supply to the component can be stopped when the component is brought into an unused condition and for instructing the power supply control means to stop power supply to the component if it is determined that power stoppage is possible; and power supply commencing means for instructing the power supply control means to commence the power supply to a component when the component, which has had its power supply, is brought into a used condition.

In addition to the clock supply control means for controlling supply of clock to each component of the information processing apparatus, clock switching means for switching the clock frequency to a normal operating value or a value lower than the normal operating value may be provided.

In this case, the clock supply stopping means determines whether or not stopping the clock supply to the component is possible when the component is brought into an unused condition and instructs the clock supply control means to stop the clock supply to the component if it is determined that this is possible, and instructs the clock switching means to switch the clock frequency into the value lower than the normal operating value when the clock supply must be maintained.

The clock supply commencing means instructs the clock supply control means to commence the clock supply to a component when a component which has had its clock supply stopped is brought into a used condition, and instructs the clock switching means to recover the clock frequency to the normal operating value when a component which has had its clock frequency lowered is brought into a used condition.

The first power saving means includes clock supply control means for controlling clock supply to individual components of the information processing-apparatus; clock supply stopping means which determines whether or not the clock supply to a component can be stopped immediately and has the capability to instruct the clock supply control means to stop the clock supply to the component if immediate stopping of the clock supply to the component is possible and a capability to instruct the clock supply control means to stop the clock supply to the component when the component remains in an unused condition for a certain period of time, which is predetermined for each component, if immediate stopping of the clock supply is impossible; and clock supply commencing means for instructing the clock supply control means to commence the clock supply to a component which has had its clock supply stopped when it is brought into a used condition.

The second power saving means includes power supply control means for controlling supply of power to individual components of the information processing apparatus; power supply stopping means which determines whether or not the power supply to a component can be immediately stopped and has the capability to instruct the power supply control means to stop the power supply to the component if the component has been in an unused condition for a period of time which is predetermined for each component if immediate stopping of the power supply is impossible; and power supply commencing means for instructing the power supply control means to commence the power supply to a component when the component which has had its power supply stopped is brought into a used condition.

The power consumption of components (hardware devices) can be controlled by the above-mentioned structure.

On the other hand, in order to control the power consumption of a CPU, the present invention provides the CPU with clock input stopping means for stopping input of clock from the clock supply control means when there is no processing to be executed and clock input commencing means for commencing the clock input from the clock supply control means when an interrupt is externally generated.

If a plurality of components are incorporated into a composite device, clock and power cannot be supplied or stopped for each of the components. Accordingly, in this case, the composite device is provided with clock supply control means for controlling supply and stop of clock to each component in response to an external instruction. Specifically, the clock control means is a switch and is formed on the same semiconductor chip as the components.

Now, operation of the invention in the above-mentioned aspects will be specifically described.

Since there are a plurality of components related with one resource in an information processing apparatus which treats as logical resources groups of components implementing a series of processing operations, a resource device management table for holding the corresponding relationship between each resource and the components related therewith and a device management table for holding information on power control of each component are implemented.

The device management table holds a "clock status" representative of whether or not clock is supplied to each component, a "power status" representative of whether or not power is supplied to each component; a "clock stop flag" representative of whether or not the clock supply to each component can be stopped when the component is brought into an unused condition, a "power stop flag" representative of whether or not the power supply to each component can be stopped when the component is brought into an unused condition, a "time-out flag" representative of whether or not immediate stop of the clock or power supply to each component is possible when the component is brought into an unused condition; a "time-out period" representative of the value of a given period of time until clock or power supply to each component is stopped if immediate stopping of clock or power supply to the component is impossible.

When use of the resource is commenced by certain processing operations, components which are related with the resource are determined from the resource management table. If it is found with reference to the clock status and power status of the device management table that clock or power is not supplied to each of the determined components, supply is commenced. When the use of the resource is terminated, components related with the resource are determined from the resource device management table. If the determined components are not used, supply of clock or power thereto is stopped as follows. If there are other resources which commonly use the determined component, supply of clock or power is stopped after it is confirmed that all the resources are not in use.

If it is determined from the clock stop flag, the power stop flag and the time-out flag that immediate stopping of clock or power is possible, supply of clock or power is stopped.

If immediate stopping of clock or power supply is not possible, supply of clock or power is stopped after the lapse of a predetermined time period.

Thus, the supply of clock or power is stopped when the component related with the resource is brought into an unused condition. The supply of clock or power is resumed when the resource is used again. Accordingly, power is supplied for the minimum period of time necessary for operation of each unit of hardware. The power consumption during operation can thus be suppressed to the minimum.

Since a power saving method which is appropriate for each hardware device is achieved in accordance with the "clock stop flag", "power stop flag", "time-out flag" and "time-out period", this invention is applicable to hardware devices having various characteristics.

Input of the supplied clock to a CPU is stopped when there is no processing to be executed. Input of the supplied clock to the CPU is resumed when an interrupt is externally generated.

This can suppress the power consumption of the CPU, which is highest, to the minimum.

Since input of clock is immediately resumed when a processing operation, which the CPU should execute, is generated in response to an external interrupt, the speed of execution in the information processing apparatus is not lowered.

The present invention has a construction that separately provides a hardware device non-dependent section which determines if each resource is in use or not and a hardware device dependent section which instructs execution and termination of the power consumption means according to the characteristics of the device corresponding to each hardware group comprising each resource. Due to the construction of the present invention, the change of the power consumption control can be minimized by changing the hardware dependent section, even when the method for reducing power consumption differs according to the characteristics of each type of hardware device.

In a second aspect of the present invention, there is provided an information processing apparatus including means for detecting the operating conditions of a device; means for switching on or off the supply of power to the device; means for measuring time; and control means for controlling the switching means to switch off the supply of power to the device if the control means confirms, based upon a detected result of the detecting means and an input from the time measuring means, that the device has been in a predetermined condition for a preset monitor time. The control means also controls the switching means to switch on the supply of power to the device when the control means confirms, based upon the result of detection of the detecting means, that the device has been taken out of the predetermined condition. The control means is characterized in that it changes the preset value of the monitor time based upon the detected result of the detecting means.

It is preferable that the control means has maximum and minimum monitor times which are upper and lower limits of the monitor times and changes the monitor time within this range.

It is preferable that the control means has a reference monitor time which is used as a reference of the monitor time, compares an interval from when the power is turned off until the power is turned on with the reference monitor time and extends and shortens the monitor time if the reference monitor time is longer or shorter, respectively.

In a further aspect of the present invention, there is provided a power monitoring apparatus including means for detecting the operating conditions of a device; means for switching on or off the supply of power to the device; means for measuring time; and control means for controlling the switching means to switch off the supply of power to the device if the control means confirms based upon a detected result of the detecting means and an input from the time measuring means, that the device has been in a predetermined condition for a preset monitor time. It also controls the switching means to switch on the supply of power to the device when the control means confirms based upon the detected result of the detecting means that the device has been taken out of the predetermined condition. The control means is characterized in that it changes the preset value of the monitor time based upon the detected result of the detecting means.

There is also provided a disc drive apparatus.

Operation of the second aspect will be described.

The control means detects the operating conditions of the equipment by means of detecting means and controls the switching means to turn off the power to the equipment on a given condition of the equipment, for example, a condition that the disk drive apparatus has not been accessed during the monitor time or longer. The control means turns on the power if the disk drive apparatus is accessed while it is in this aforementioned condition. At this time, the control means measures the period of time from turning off until turning on.

The control means shortens the monitor time by a given period of time if the measured period of time is longer than the monitor time. That is, the period of time until the power is turned off is shortened. The control means extends the monitor time by a given period of time if the measured period of time is shorter than the monitor time. That is, the control means extends the period of time until the power is turned off. The monitor time is changed within a range between the maximum and the minimum monitor times. If the monitor time does not fall within this range, the monitor time is set to the minimum or maximum monitor time.

DETAILED DESCRIPTION OF THE PREFERRED EMBODIMENTS

Figure 1A:
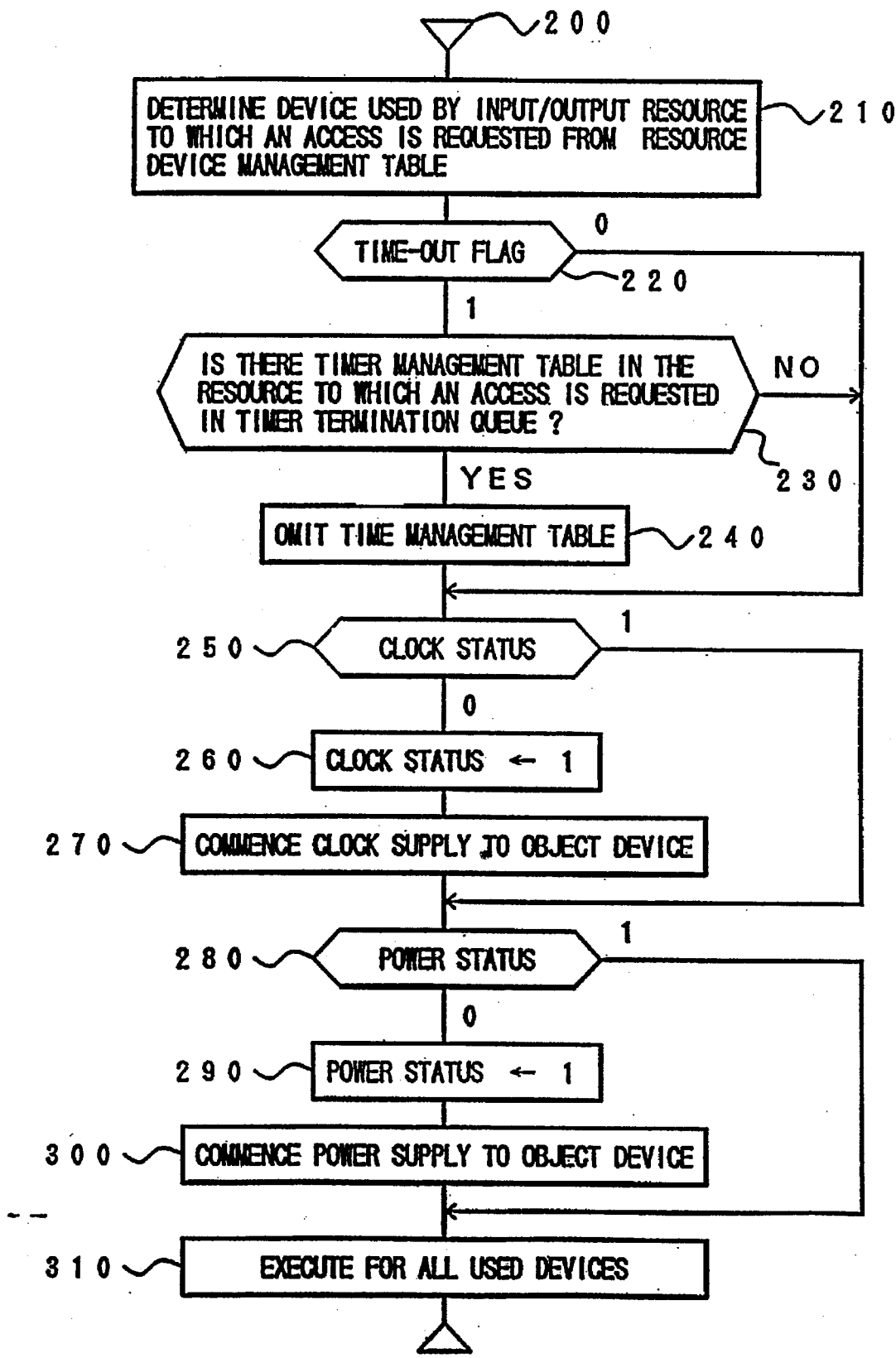
FIGS. 1(a) to (e) are flow charts showing the processing steps of a power consumption control system which is an embodiment of the present invention.

An embodiment of the present invention will be described with reference to the drawings.

The configuration of an information processing system to which an embodiment of a power consumption control system of the present invention is applied will be described with reference to FIG. 2.

In the drawing, a reference numeral 1 denotes a central processing unit (CPU); 2 a main memory (MM); 3 a clock generator (CG); 4 a direct memory access controller (DMAC); 5 a power controller; 6 a video memory (VRAM); 7 a liquid crystal display controller (LCDC); 8 a liquid crystal display (LCD); 9 a backlight (BL); 10 a floppy disk controller (FDC); 11 a floppy disk driver(FDD); 12 a communication controller (SCC1); 13 a keyboard (KB); 14 a communication controller (SCC2); 15 a modem unit (MU); 16 a communication controller (SCC3); 17 an image scanner (IS); 18 a printer controller (PRC); 19 a printer; 20 a main bus (MB); 21 a power unit (PU); and 22 a timer (TIM).

Figure 2:
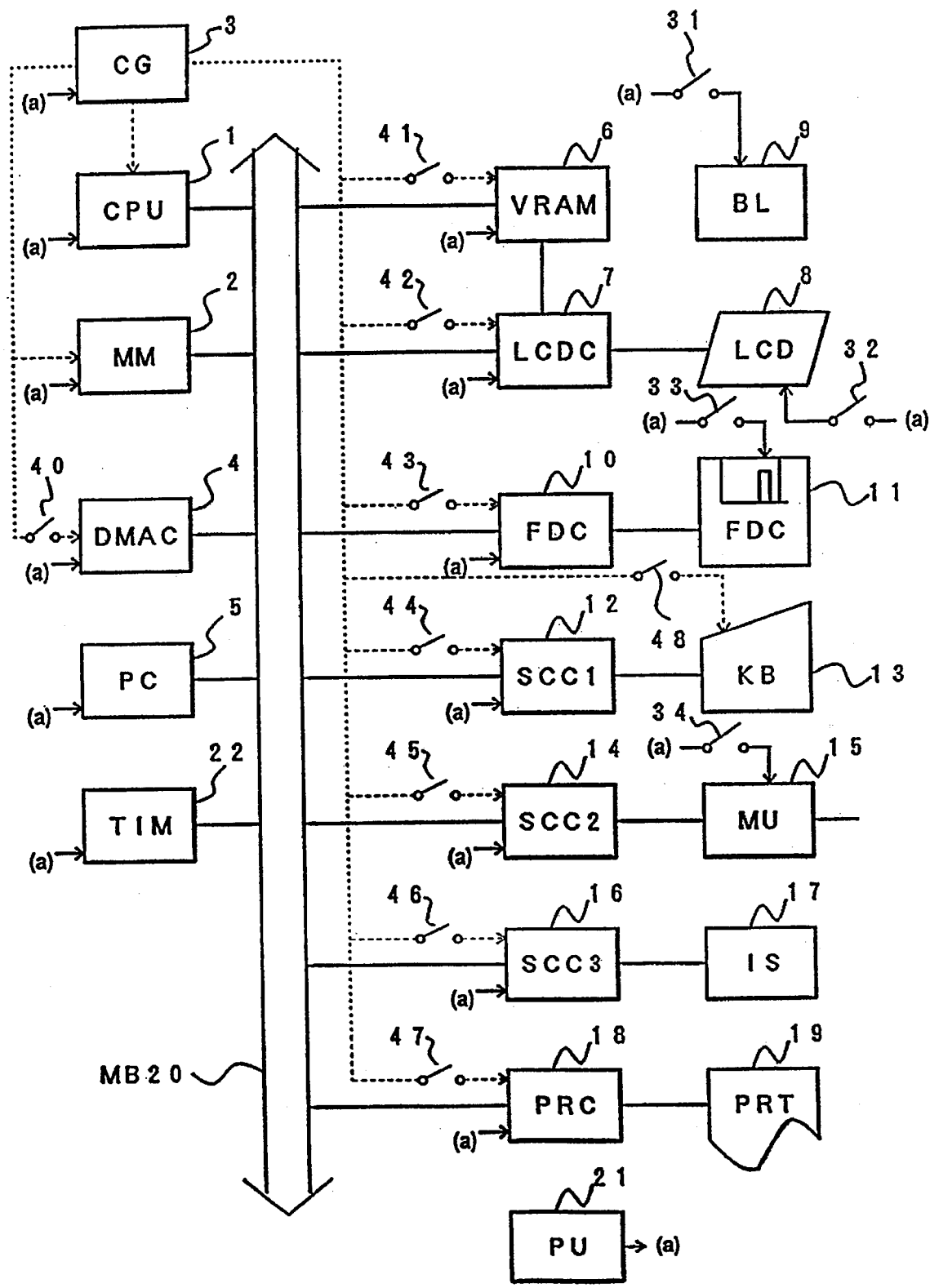
FIG. 2 is a block diagram showing the hardware configuration of an information processing apparatus to which the power consumption control system of the present embodiment is applied.

In FIG. 2, CPU 1 successively interprets programs stored in MM 2 for controlling each peripheral device and for executing processing. CPU 1 has a sleep command and a capability to resume processing by an interrupt and is capable of stopping/resuming the clock supplied from CG3 by itself.

The DMAC 4 is an LSI for performing high speed data transfer between MM 2 and each of the peripheral devices without transferring through the CPU 1. PC 5 controls supply of clock and power to each of peripheral devices. Specifically, it has the capability of individually turning on or off clock switches 40 to 48 and switches 31 to 34 for the PU 21.

The VRAM 6 stores the display content of each dot on the LCD 8. The LCDC 7 periodically reads out the contents of the VRAM 6 for displaying them on the LCD 8. The BL 9 illuminates the LCD 8 from the rear side thereof to provide an easily visible display.

The FDC 10 controls the FDD 11 to read/write to and from the floppy disk.

The SCC1 12 controls the KB 13 to accept information on key entry. The SCC2 14 controls the MU 15 for performing data communication via the public network to perform communication processing. The SCC3 16 controls the IS 17 to perform processing for accepting image data.

The PRC 18 controls the PRT 19 to perform a printing operation. TIM 22 is used for time measuring and generates an interrupt for the CPU 1 at regular intervals.

These peripheral devices are coupled with each other via the MB 20 and exchange data with each other via MB 20.

PU 21 supplies power to all devices except for the IS 17 and the PRT 19 which are housed in separate casings and have their own power sources. In the present embodiment, only the power of the BL 9, LCD 8, FDD 11 and MU 15 can be turned on or off.

The configuration of software operated on the foregoing hardware will be described with reference to FIG. 3.

Figure 3:
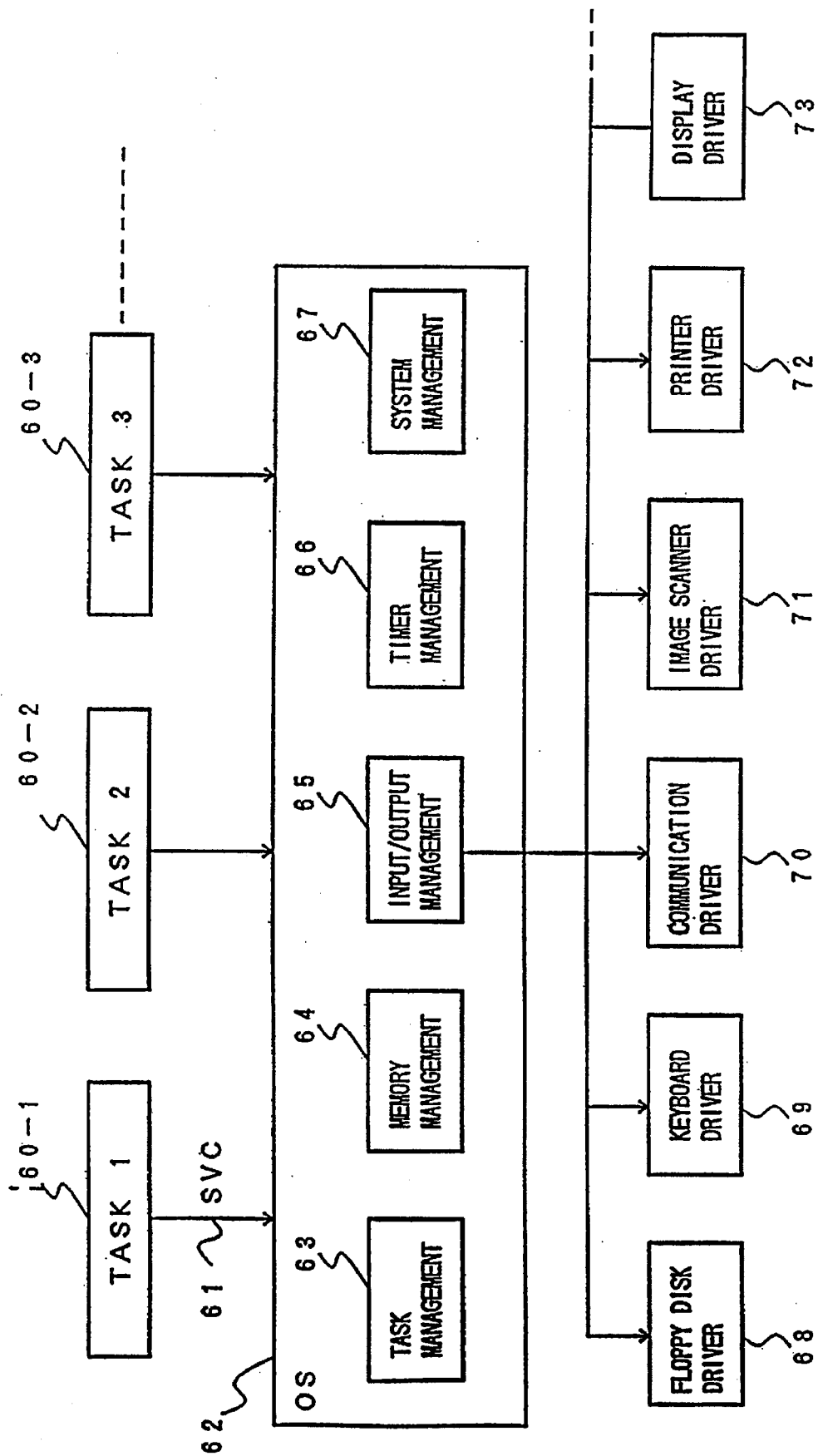
FIG. 3 is a block diagram showing a software configuration in the present embodiment.

In FIG. 3, an operating system (OS) 62 has common capabilities which are necessary to operate the users' jobs. A program which is operated on the OS 62 to achieve the users' jobs is referred to as "Task" 60.

The OS 62 has a multi-task capability to execute a plurality of tasks 60 in parallel. Each of tasks 60 controls processing of the CPU 1 and each input/output device to perform a desired function.

The OS 62 manages hardware devices which are necessary for tasks 60 to operate in the concept of "logically abstracted resource" so that the tasks 60 can easily operate the hardware devices.

For example, the OS 62 collectively treats hardware devices such as the FDC 10, DMAC 4, FDD 11, and floppy disks loaded in the FDD 11 as resource type "floppy disk" and treats the VRAM 6, LCDC 7, LCD 8 as resource type "display". This enables the tasks 60 to use the function of each hardware device without recognizing physical control of hardware.

The OS 62 has functional blocks as follows:

(1) A task management block 63 for managing the operating state of the task 60 operated on the OS 62 and for controlling so as to sequentially allocate a CPU resource to each of the tasks 60.

(2) A memory management block 64 for allocating a memory resource to the program and data of each of the tasks 60 and for locating it on the MM 2 and for managing the usage condition of the memory.

(3) An input/output management block 65 for managing the usage condition of each input/output resource and to sequentially allocate each input/output resource to each of the tasks 60.

(4) A timer management block 66 for managing a processing condition for time monitoring and for executing a predetermined processing when a preset time has lapsed.

(5) A system management block 67 for initializing the OS 62 and for performing error processing.

Blocks for performing physically dependant controls of input/output resources are referred to as physical device drivers. A physical device driver is provided for each input/output resource. Input/output processing of the resources is achieved by controlling these physical drivers by means of the input/output management block 65.

In the present embodiment, the physical device drivers include a floppy disk driver 68, a keyboard driver 69, a communication driver 70, an image scanner driver 71, a printer driver 72 a display driver 73.

If a device is newly added, an additional physical device driver for this added device is prepared and registered in the OS 62. This enables the added device to be used as a resource by the tasks 60.

Means for calling the foregoing functional blocks of the OS 62 from the tasks 60 is referred to as supervisor call (SVC)60.

How the tasks 60 and input/output resources are generally operated by the OS 62 will be described with reference to FIG. 4.

In this case, it is assumed that a Task A and a Task B will be operated on in parallel and that the priorities of the tasks will be the same.

Figure 4:
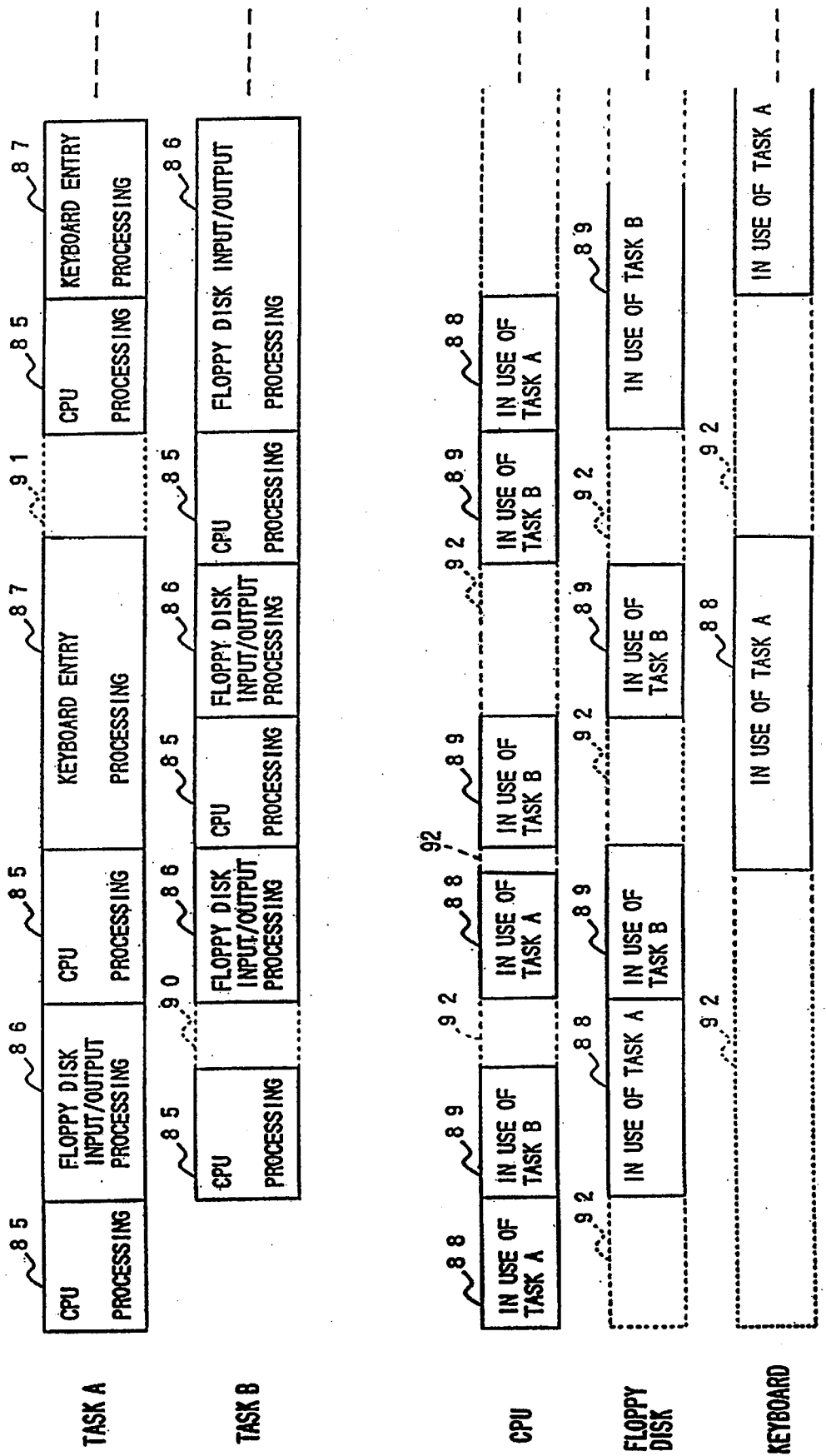
FIG. 4 is a chart explaining the operation of a multi-task OS.

FIG. 4 is a time chart showing the processing content of each task with the lapse of time.

If the tasks are executed in order of the Tasks A and B, the CPU processing 85 of the task A is commenced in the order in which they arrive. If the task A begins floppy disk input/output processing 86, the OS 62 allocates an empty CPU resource 85 to the task and commences the CPU processing 85 of the task B since the CPU resource is not necessary during this processing.

If the task B issues a floppy disk input/output request to the OS 62 before the floppy disk input/output processing 86 of the task A is completed, the OS 62 performs a control so that the floppy disk input/output processing 86 of the task B is put into a wait state, as represented by a dotted line 90, until the floppy disk input/output processing 86 of the task A is completed since only one task can be used for one resource.

Thereafter, the task B repeats the floppy disk input/output processing 86 and the CPU processing 85 while the task A performs the keyboard input processing 87 after executing the CPU processing 85. Since no conflicts of use among tasks occurs during this processing, two tasks operate in parallel.

If the keyboard input processing 87 is then completed, the task A will try to execute the CPU processing 85. However, the task A waits for execution of the CPU processing 85, as represented by a dotted line 91, since the task B is executing the CPU processing 85.

A chart showing the usage conditions of each resource is shown in FIG. 4. It is further found from FIG. 4 that resources such as the CPU, floppy disk and keyboard are not always used and conditions which are not used by any tasks frequently occur as represented by dotted line 92.

Generally, a plurality of tasks are rarely operated in parallel in an information processing system such as a word processor which performs processing in response to an input from an user. Since processing is executed while sequentially using each resource when user's editing operation is performed, the activity ratio of each resource in an actual use condition is considerably lower than that shown in FIG. 4.

As mentioned above, the multi-task OS manages each hardware device according to a concept resource. A condition in which each resource is not used exists in the situation in which tasks are actually operated.

The power which is consumed by hardware devices constituting the resources is very high in the situation where the resources are not used. If the power consumed in the unused condition can be reduced, it becomes possible to reduce the total consumed power without lowering the processing speed of a computer system.

A power consumption management system provided in the OS 62 of the present embodiment will be described. First though, operation of the OS 62 which is necessary in explaining the management system will be described.

Figure 5A:
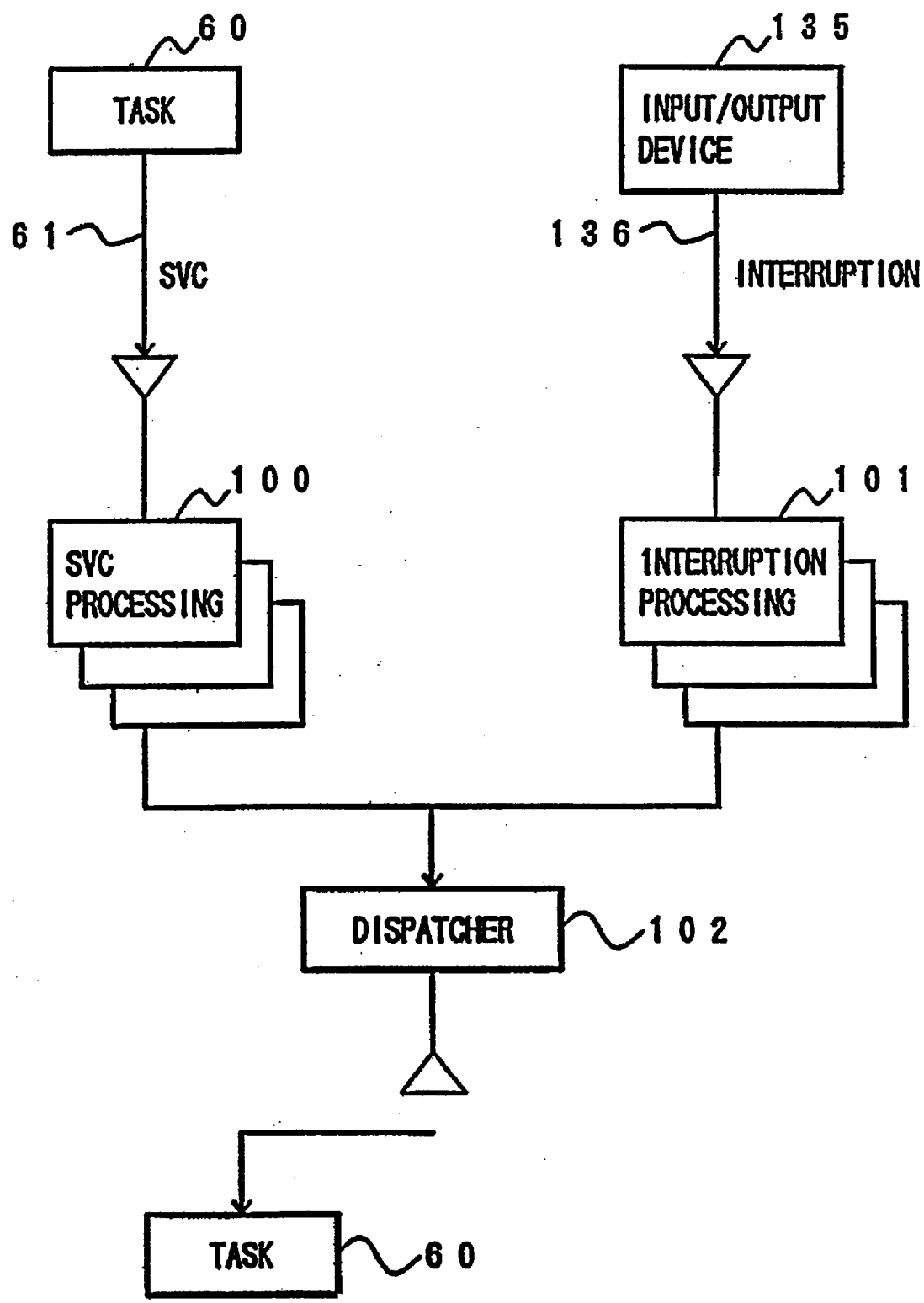
FIGS. 5(a) to (c) are flow charts showing the processing structure, queue and table structure of the multi-task OS.
Figures 1, 5B:
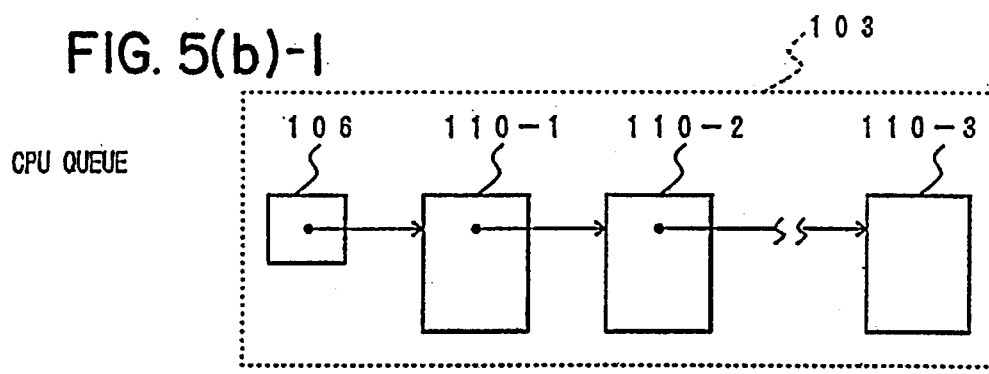
Figures 2, 5B:
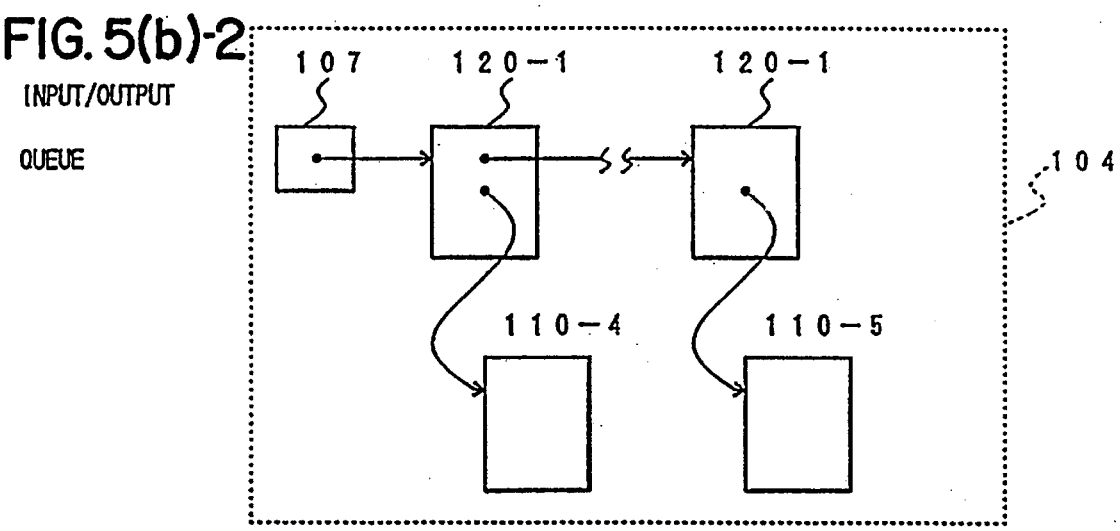
Figures 3, 5B:
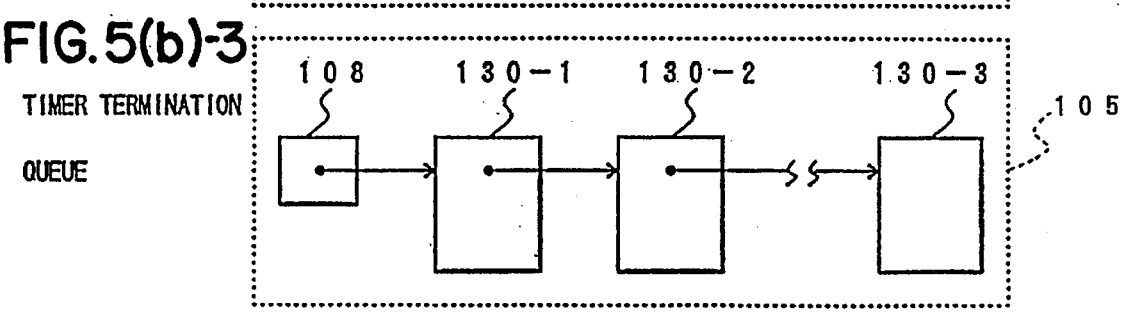
Figures 1, 5C:
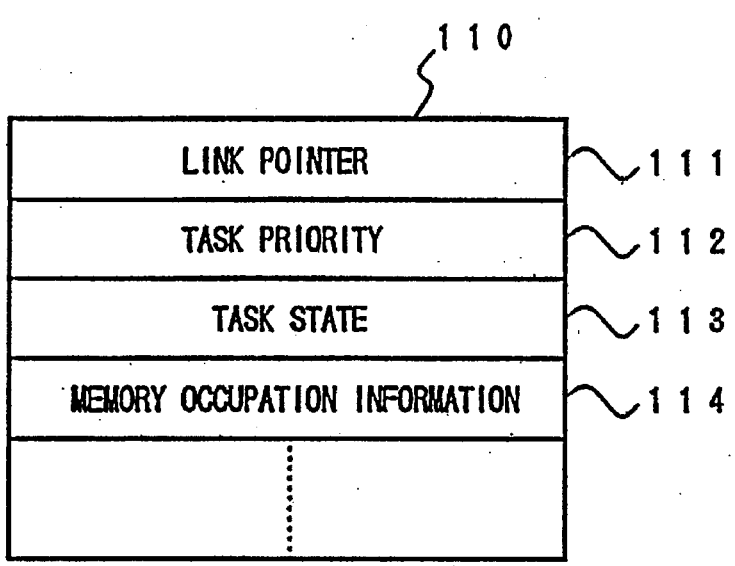
Figures 2, 5C:
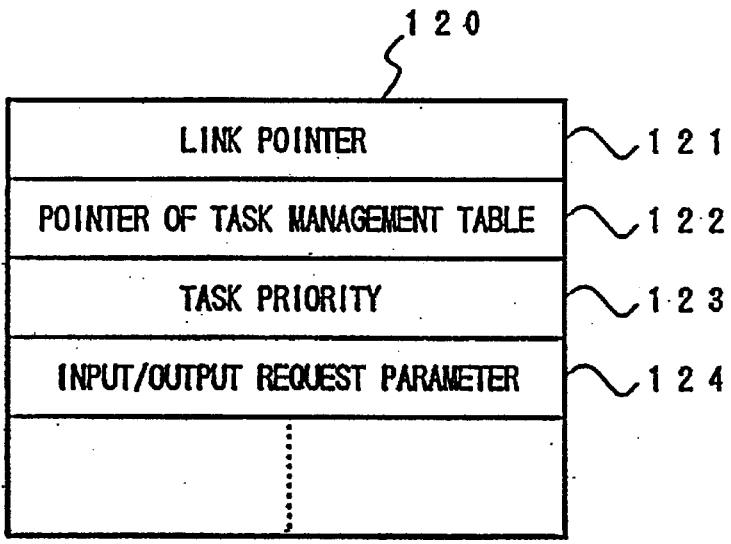
Figures 3, 5C:
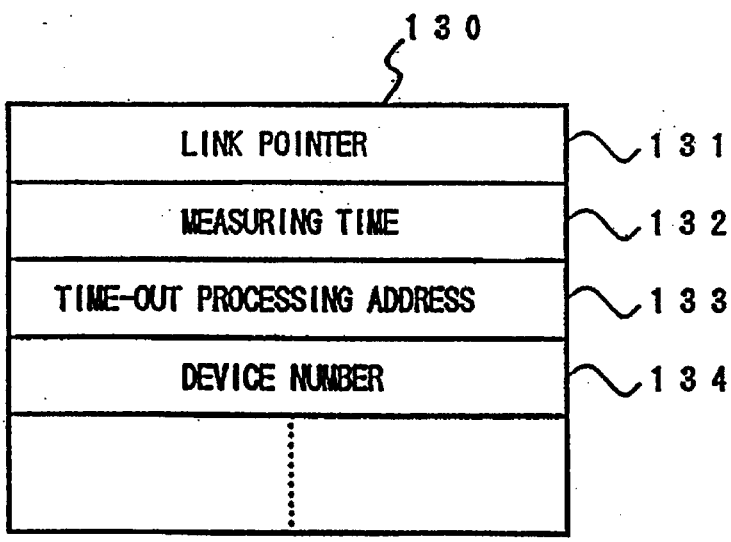
Figure 6A:
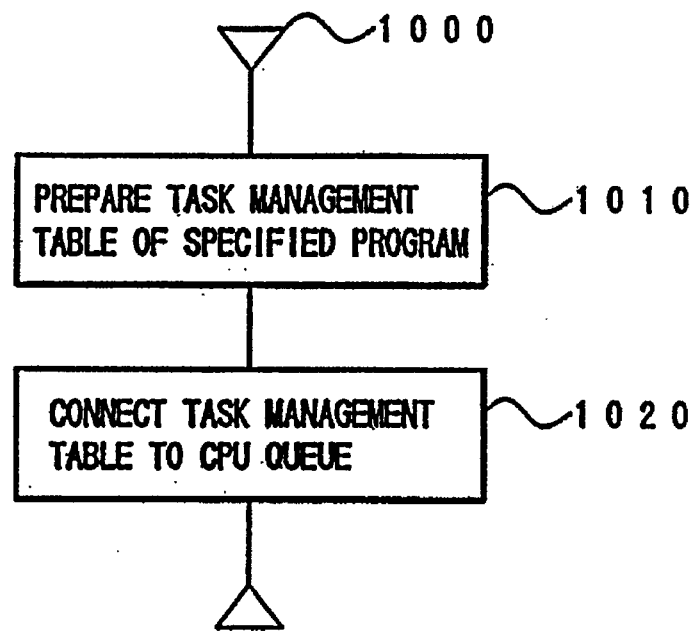
FIGS. 6(a) to 6(d) are flow charts showing the task control processing and the input/output control processing of the multitask OS.
Figure 6B:
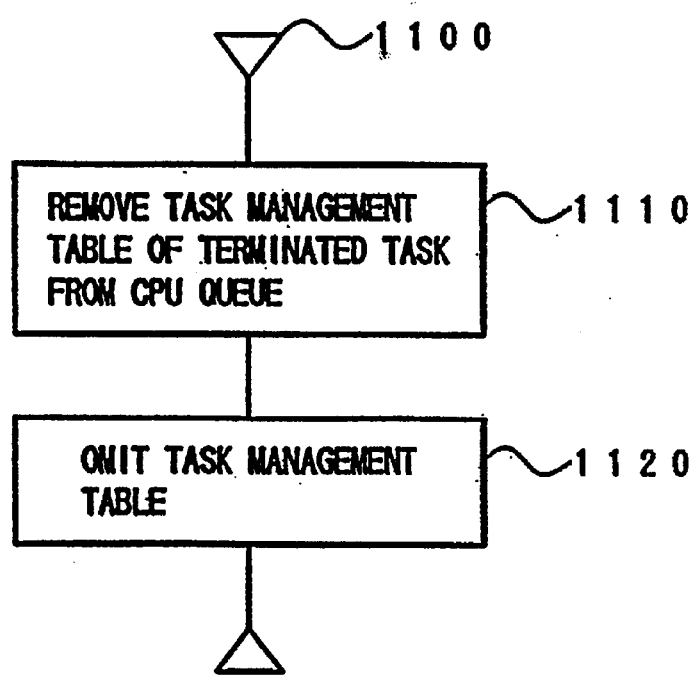
Figure 6C:
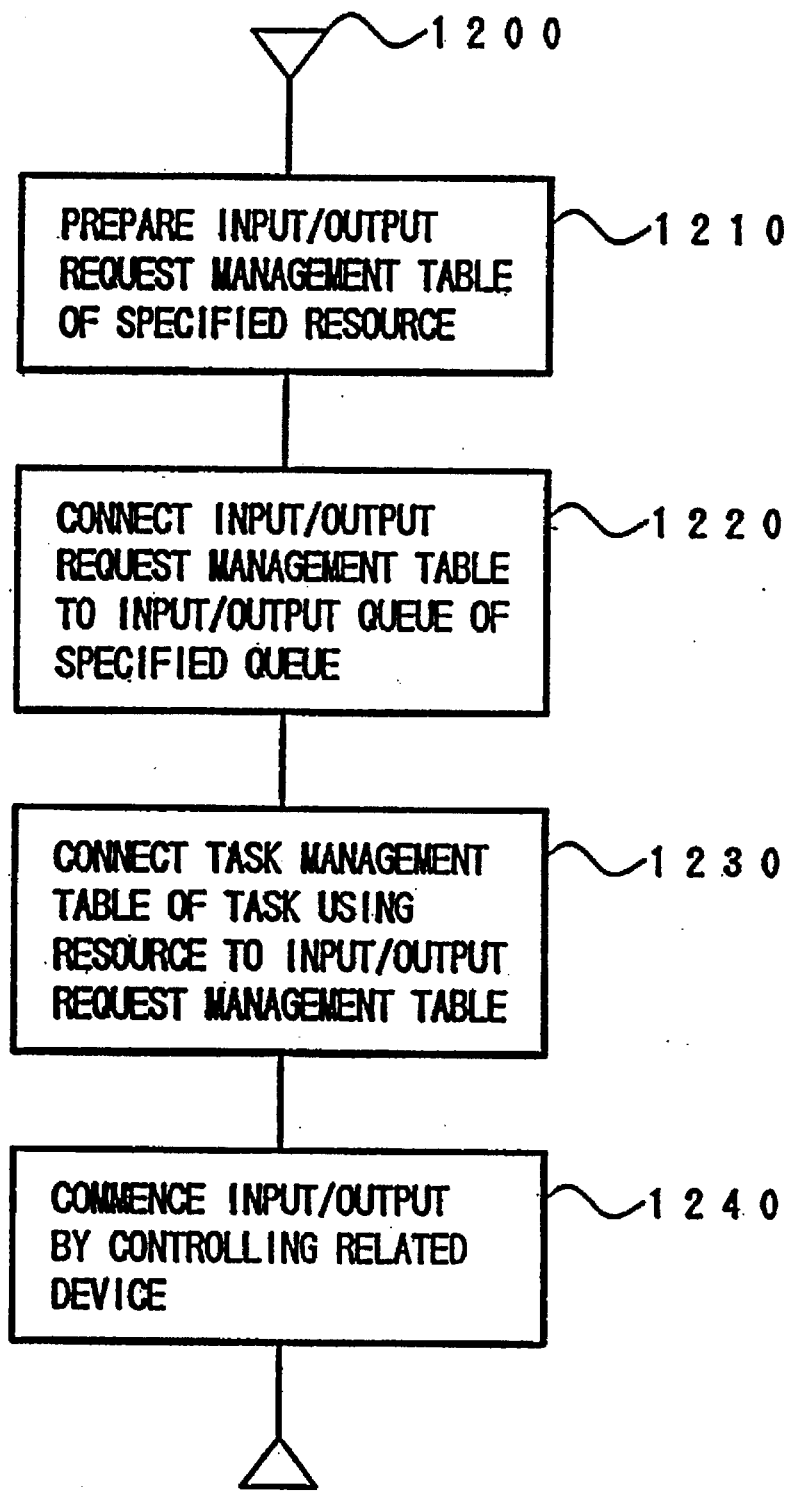

FIGS. 5(a) to 5(c) show the program configuration of the OS 62 for achieving the input/output control of the task 60 and the configurations of queues and tables used for the input/output control of the task 60. FIG. 6(a) to 6(c) show the flow chart of the processing.

In FIG. 5(c), a task management table 110 is a table for managing the condition of the task 60 operated on by the OS 62. The task management table 110 includes as fields, a link pointer 111 pointing to another task management table 110, the priority 112 of the tasks 60, task state 113 representative of whether the task 60 is executing or waiting for input/output and memory occupation information 114 representative of where in the MM 2 the program of the task 60 is to be placed.

An input/output request management table 120 manages the input/output processing condition which is requested by the task 60 and includes as fields, a link pointer 121 pointing to other input/output request management tables 120, a pointer 122 pointing to the task management table 110 of the task 60 which is executing an input/output request, a priority 123 of the task 60, and an input/output request parameter 124 representative of the contents of the input/output processing.

A timer management table 130 has control information of a timer which is used when processing is desired to be executed after a given period of time and includes as fields, a link pointer 131 pointing to another timer management table 130, a measuring time 132 for which the residual time until time out is held, a time out processing address 133 representing a processing program which is executed at time out, and a device number 134 representative of which hardware device the timer is designated for.

In FIG. 5(b), the CPU queue 103 links the task management tables 110 from the head pointer 106 via the link pointer 111 and manages the order of the tasks 60 for allocating the CPU resources.

An input/output queue 104 is provided for each input/output resource and links the input/output request management table 120 from the header pointer 107 via the link pointer 121.

Since each input/output request management table 120 manages to show which task the input/output is requested from, it links the task management tables 110 via the pointer 122 pointing the task management tables 110. The input/output queue 104 manages the order of allocation of each input/output resource to the tasks 60.

A timer termination queue 105 links the timer management table 130 from the header printer 108 via the link pointer 131 and manages respective states of the preset timers.

As shown in FIG. 5(a), when the task 60 issues the SVC 61, the OS 62 executes SVC processing 100. When an interrupt 136 is issued from an input/output device 135, the OS 62 executes interrupt processing 101.

When the task 60 issues SVC 61 for generating and activating another task 60, the OS 62 executes SVC processing shown in the flow chart of FIG. 6(a) as the SVC processing 100.

In the SVC processing 1000, the task management tables 110 of the specified programs are prepared in step 1010 and the prepared task management tables 110 are connected with the CPU queue 103 in step 1020.

At this time, the task management tables 110 are arranged in accordance with the task priority 112 and arranged in order from previously activated tables if the priority is the same.

When the activated task 60 issues SVC 61 representative of the termination of itself, the OS 62 executes SVC processing 1100 shown in the flow chart of FIG. 6(b) as the SVC processing 100.

In the SVC processing 1100, the task management table 110 of the task 60 is removed from the CPU queue 103 in step 1110 and is omitted in step 1120.

When the activated task 60 issues SVC 61 for executing an input/output request of a resource, the OS 62 executes SVC processing 1200 shown in the flow chart of FIG. 6(c) as SVC processing 100.

In the SVC processing 1200, the input/output request management tables 120 of the specified resources are prepared in step 1210 and the input/output request management tables 120 are connected to the input/output queues 104 of the resources which will be objects. At this time, the tables are arranged in order of priority similarly to the CPU queue 103.

Then, the task management table 110 of the task 60 which executes the input/output request is removed from the CPU queue 103 in step 1230 and is connected with the pointer 122 pointing to the task management table 110 in the prepared input/output request management table 120 in step 1230.

Finally, an input/output processing is commenced by controlling actual hardware devices in step 1240. When the input/output processing of the resource is completed, an interrupt 136 is generated from the input/output device 135 and the OS 62 executes interrupt processing 1300 shown in the flow chart of FIG. 6(d) as the interrupt processing 101.

In the interrupt processing 1300, devices which are related with the input/output and require initialization are initialized without hindering the other input/output requests in step 1310. The input/output request management table 120 of the input/output resource, the processing of which is completed is removed from the input/output queue 104 and returned to the CPU queue 103 in step 1320 and the input/output request management table 120 is omitted in step 1330.

After the SVC processing 100 and the interruption processing 101 have been performed in such a manner, a processing which is referred to as "dispatcher 102" shown in FIG. 5(a) is called.

In the dispatcher 102, the processing of the task 60 which is represented by the leading task management table 110-1 is resumed by looking at the CPU queue 103. If there is no task management table 110 in the CPU queue 103, the program is brought into an idling state and is looped in the dispatcher 102.

If the task 60 requests an input/output by the foregoing processing, the task management table 110 is removed form the CPU queue 103 and the execution of the CPU processing is waited for until the input or output is completed.

Determination as to whether or not the resource is used can be made by merely looking at whether each input/output queue 104 or the CPU queue 103 is empty by performing such a control within the OS 62.

Now, power consumption control processing which is performed by using such a resource management of the OS 62 will be described.

Referring now to FIGS. 7 and 1, there are shown the configuration of the table provided for the power consumption control and the flow of actual processing, respectively.

Figures 7A, 7B:
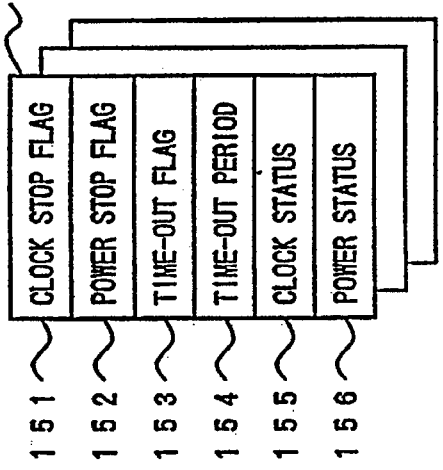
FIGS. 7(a) and 7(b) are schematic tables showing the structure of tables in the present embodiment.

A resource device management table 140 is provided as shown in FIG. 7(a).

The resource device management table 140 comprises a two dimensional array including resource numbers 141 each uniquely representative of a resource on the OS 62 and device numbers 142 each uniquely representative of a hardware device which individually performs an operation. Each element in the array has a flag representative of whether or not each device is involved in the operation for a resource.

For example, the DMAC of #0, FDC of #5, and FDD of #6 are used for the input/output processing of the floppy disc resource of #0.

In this table, a device number 142 is given to objects to which supply of clock and power are controlled.

A device management table 150 is provided corresponding to each hardware device to which the device number 142 is allocated as shown in FIG. 7(b).

These hardware devices are classified into two groups in view of power consumption control.

The first group comprises LSIs such as the DMAC 4, the VRAM 6 and FDC 10 which require power supply for holding internal chip states and whose power consumption can be considerably reduced by stopping the supply of clock and devices such as the FDD 11, BL 9 and MU 15, the power consumption of which can be reduced merely by turning off the power supply.

The field of clock stop flag 151 and power supply stop flag 152 control these devices. Respective flags represent whether or not the clock or the power source may be turned off when the hardware is not used. The values "0" and "1" represents "no permission" and "permission", respectively.

On the other hand, the second group comprises devices such as the CPU 1 and peripheral LSIs, the clock or the power source of which may be turned off immediately if the hardware device is not used, devices such as the FDD 11 which may consume a lot of power upon reactivation if it is frequently turned off, and devices such as the LCDC 7, LCD 8 and BL 9, the clock or the power source should be turned off after confirming that they will not be used for a given period time, the reason for this being that the power source cannot be immediately turned off even if the device is not used as a resource since the display becomes invisible when the power is turned off.

The field of time out flag 153 and time-out period 154 control these devices.

The time-out flag 153 represents whether or not the power source may be turned off when the device is not used. The values "0" and "1" represent "permission" and "no permission", respectively.

The time-out period 154 is valid only when the time-out flag 153 is "1" and has for each device a value which defines a period of time for no use of the device after which the power source may be turned off.

A clock status 155 and a power source status 156 hold a status representative of whether or not the clock and the power are supplied to each device. The states "0" and "1" represent "not supplied" and "supplied", respectively.

Power consumption control processing which is performed in accordance with such table will be described with reference to FIG. 1.

The power on processing 200 for a resource shown in the flow chart of FIG. 1(a) is added between steps 1230 and 1240 in the resource input/output commencement processing 1200 (FIG. 6(c)) which is performed as the SVC processing 100 of FIG. 5.

In step 210, the hardware used by the input/output resource to which an access is requested is determined by searching a device having a value "1" in the resource device management table 140.

Processing of steps 220 to 310 is repeated for each determined device.

That is, the time-out flag 153 of the device is checked in step 220.

If the time-out flag 153 is "1", the power or clock is turned off for saving power only when the device has not been used for a given period of time in the present embodiment. To this end, the timer is preset to a measuring time when the use of the resource is terminated. If the use of the resource is resumed before the preset timeout has elapsed, the timer is cancelled.

In other words, the timer management table 130 having a device number 134 of a device involved in the resource to which an access is requested is searched for in the timer termination queue 105 in step 230. If found, the timer management table 130 is omitted from the timer termination queue 105 in order to stop timer measurement in step 240.

If the clock status 155 is "0" representing "not supplied" in step 250, the status 155 is changed into "1" representing "supplied" in step 260. The supply of clock to an object device is commenced via the PC 5 in step 270.

If a power source status 156 is "0" representing "not supplied" in step 280, the status is changed into "1" representing "supplied" in step 290. Supply of power to an object device is commenced via PC 5 in step 300.

Normal operation of the hardware devices are assured by performing processing shown in step 1240 of FIG. 6(c) after the above mentioned processing has been performed for all devices involved with the resources to be accessed in step 310.

Figure 1B:
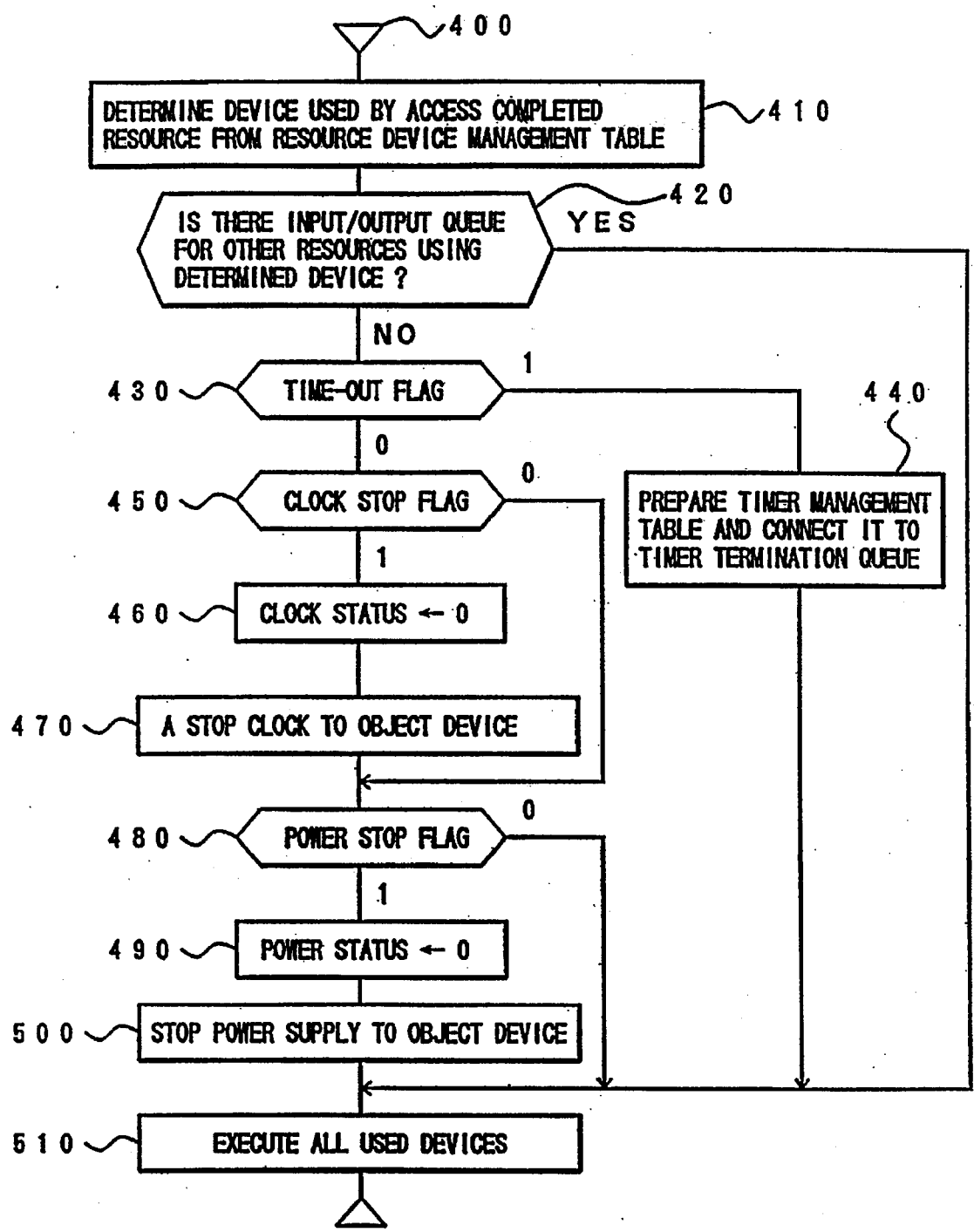
Figure 6D:
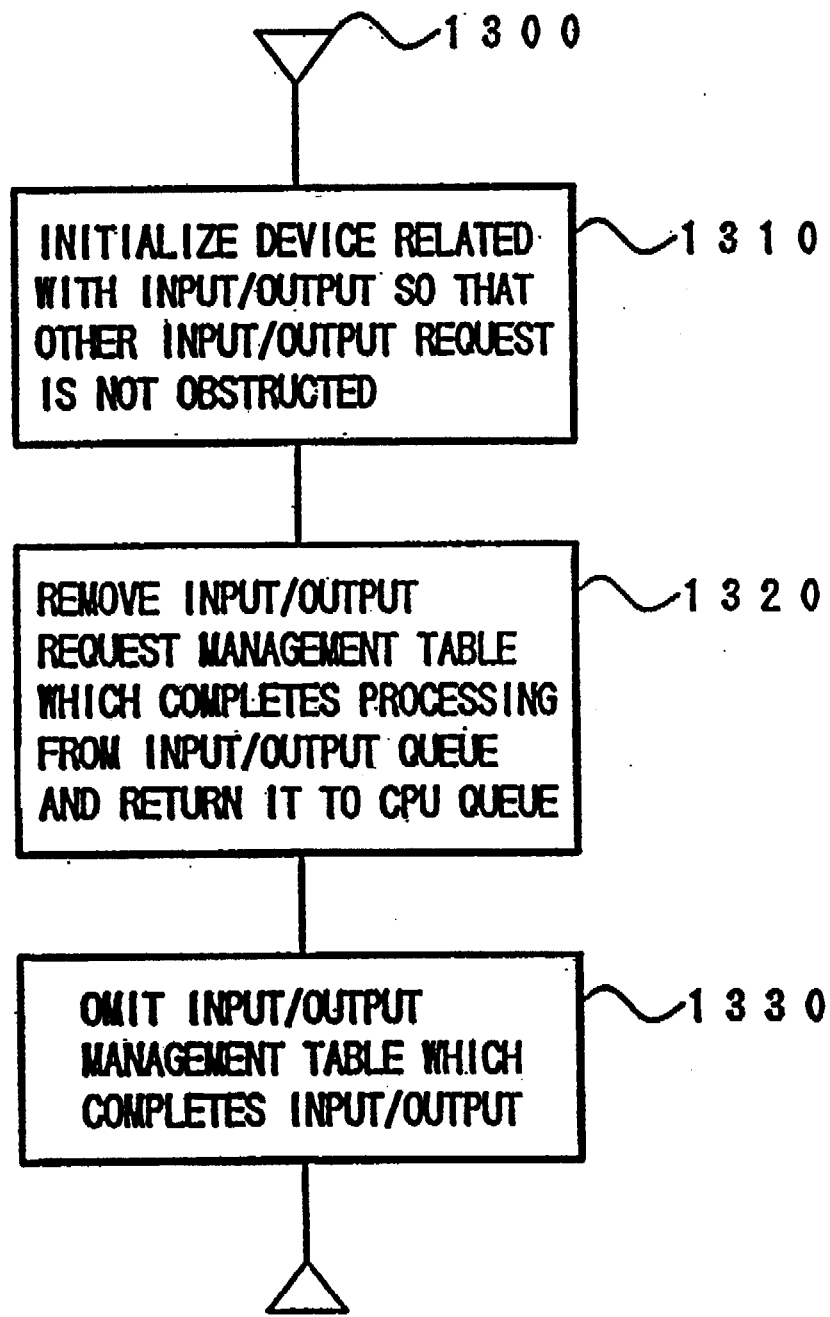

Resource power off processing 400 shown in the flow chart of FIG. 1(b) is performed immediately after the completion of input/output processing 1300 (FIG.6(d)) performed as the interruption processing 101 of FIG. 5.

A device which is involved with the resource, an access to which is completed, is determined by searching for a device in which the value of the resource device management table 140 is "1" in step 410 after the input/output request management table 130, an access to which is completed, is omitted by the input/output completion processing 1300.

Processing of steps 420 to 510 is repeated for each determined device.

In other words, determination of whether or not there are other resources involved with the device is made with reference to the resource device management table 140 in step 420. If there are any resources, whether or not all the input/output queues 104 of the resources involved with the device are empty is checked.

If there is no resource which is being processed in step 420, the time out flag 153 is then checked in step 430. If the flag is "1", the timer management table 130 is generated and is connected with the timer completion queue 105 to commence time measuring in step 440 since the power source and clock should be turned off if there is no access for a given period of time after completion of the access.

At this time, a value of the timeout 154 of the device management table 150 is initially set to the measuring time 132 of the timer management table 130. An execution address of the timeout processing prepared depending upon each device is set to the time out processing address 133. The number of the device which completes the processing is set to the device number 134.

On the other hand, if the timeout flag 153 is "0" in step 430, the clock stop flag 151 is then checked in step 450. If the flag is "1" (stop is possible), the value of the clock status 155 is then changed into "0" (not supplied) in step 460. Supply of clock to an object device is stopped via the PC 5 in step 470.

The power source stop flag 152 is also similarly checked in step 480. If the flag is "1" (stop is permitted), the value of the power source status 156 is then changed to "0" (not supplied) in step 490. Supply of power to an object device is stopped via the PC 5 in step 500.

After the devices which have not been used are all checked when input/output is completed by the above mentioned processing (step 510), the power and clock can be immediately stopped.

The relationship between the device and the resource is managed by the resource device management table 140 so that determination as to whether or not a device, such as the DMAC 4, which is used by a plurality of resources is being used can be easily made by checking all the states of the input/output queues 104 of corresponding resource.

A device which has its power source or clock turned off if the time-out flag 153 is "1", that is, a device which is not used for a given period of time, will be described.

Figure 1C:
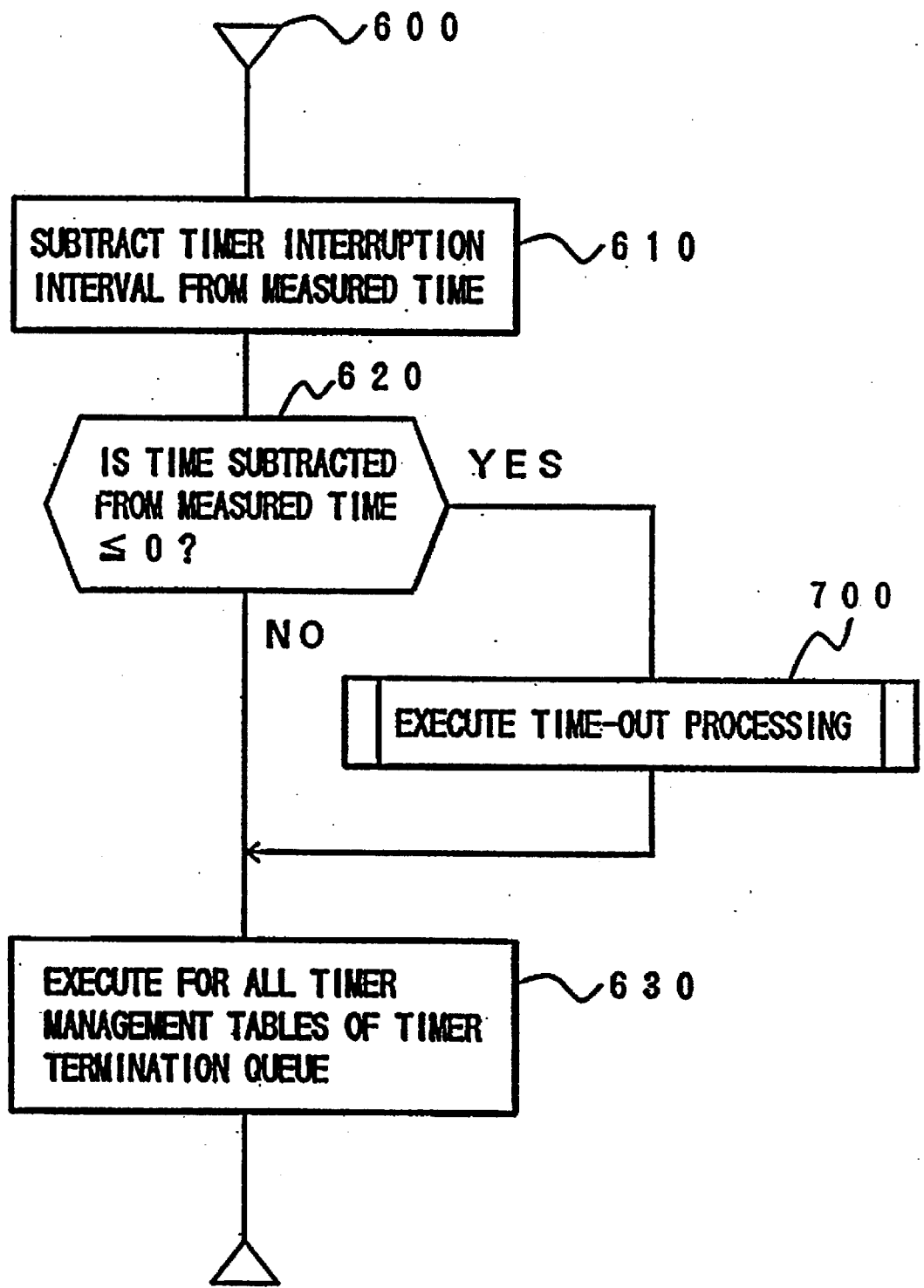

When a timer is set in step 440 in the resource power off processing 400 shown in the flow chart of FIG. 1(b), timer interrupt processing 600 shown in the flow chart of FIG. 1(c) is generated periodically.

In the timer interrupt processing 600, processing is performed for each timer management table 130 of the timer termination queue 105 as follows:

The time of the timer interrupt period is subtracted from the measured time 620 in step 610. When thus subtracted time becomes "0" or less, that is, the time which has been initially set in the timer management table 130 has lapsed, the time-out processing 700 which the time-out processing address 133 addresses is executed in step 620.

Figure 1D:
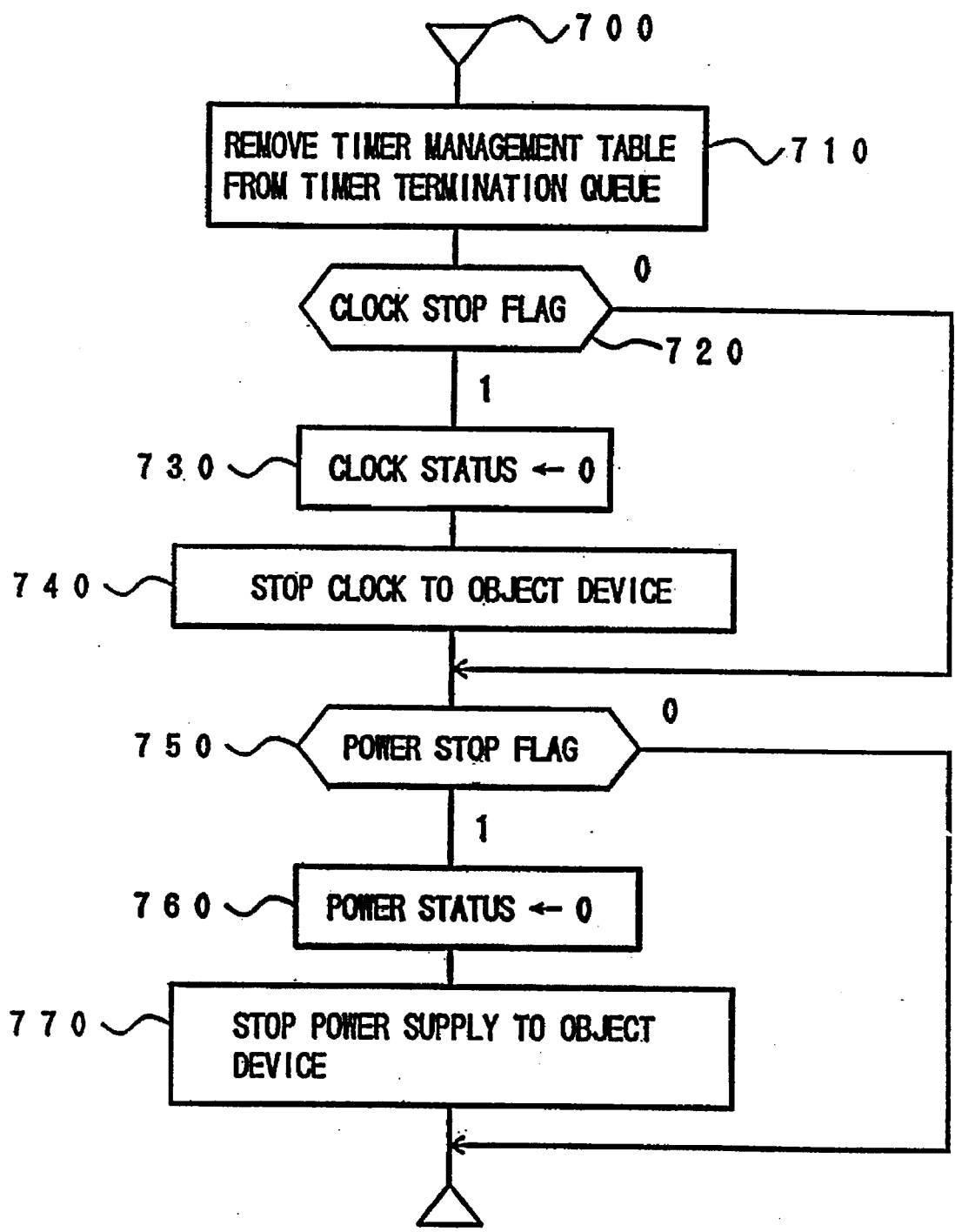

As shown in the flow chart of FIG. 1(d), in the time-out processing 700, the timer management table 130 in which time-out occurs is removed from the timer termination queue 105 in step 710. If the clock stop flag 151 is "1" (stopping is permitted) in step 720, the value of the clock status 155 is changed into "0" (not supplied) in step 730 and supply of clock to an object device is stopped.

If the power source stop flag 152 is "1" (stopping is permitted) in step 750, the value of the power source status 156 is changed into "0" (not supplied) is step 760. Supply of power to an object device is stopped in step 770.

Power saving is achieved by stopping the supply of power or clock to the device in accordance with the above mentioned processing when the device has not been used for a period of time which was preset in the time-out period 154 of the device management table 150 for each device.

Supply of power or clock is resumed at the time when input/output of the resource which is involved with the device is commenced as shown in the flow chart of FIG. 1(a).

Figure 1E:
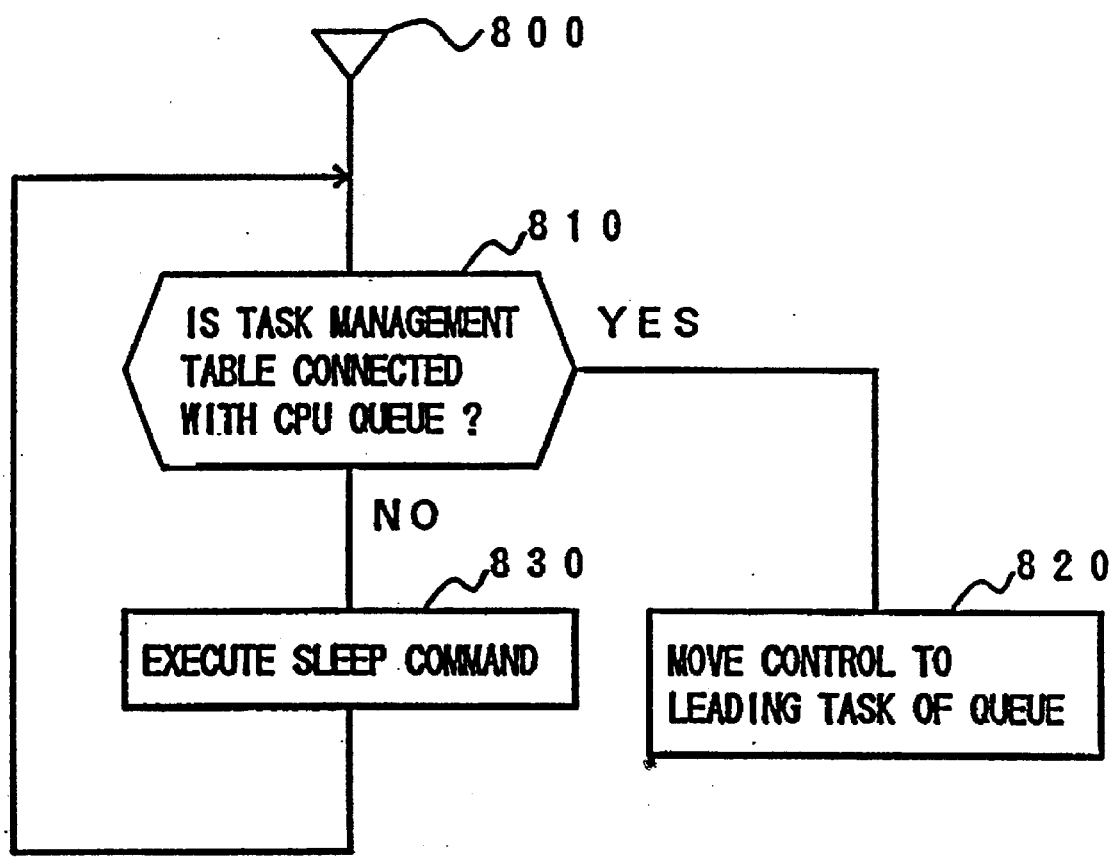

Now, a power consumption control processing 800 for the CPU resource will be described with reference to the flow chart of FIG. 1(e).

This processing is executed in the dispatcher 102 in FIG. 5.

The dispatcher 102 has heretofore functioned to resume the execution of the task 60 corresponding to the task management table 110-1 with reference to the leading task management table 110-1 of the CPU queue 103 (corresponding to step 820). When there is no task management table 110 in the CPU queue 103, that is, there is no task which is to execute the CPU processing, the CPU is brought into an idle state and only repeats a loop in the dispatcher.

In contrast to this, a CPU sleep command is issued as shown in step 830 in the present embodiment when the CPU is brought into an idle sate. Accordingly, wasteful power consumption due to the idle state of the CPU is prevented by stopping clock of the CPU per se.

Since supply of the clock to the stopped CPU 1 is immediately resumed on execution of interrupt processing, when an interrupt is externally generated, control of peripheral hardware devices is not obstructed.

When the interrupt processing is completed, the processing of the dispatcher 102 is returned to step 810 to complete the input/output by the interrupt processing. If the task management table 110 is connected with the CPU queue 103, the task 60 is then executed. If not connected, the sleep command is continuously issued.

The power consumption of each device, to which the supply of the power or clock can be turned on or of in real time, can be reduced without lowering the execution speed by immediately stopping the supply of the power or clock thereto when the device is brought into an unused condition in the present embodiment as mentioned above.

Power saving of the device, supply of power and clock to which cannot be turn on or off in real time can be also achieved by using the time management block 66 of the OS 62 if the device has not been used for a given period of time.

In such a manner, supply of power and/or clock to the device which is not related with the processing which an user executes can be stopped at any time even when the user actually uses an information processing system. As a result, the power consumption of the whole of the information processing system can be suppressed to the minimum without having a detrimental effect on the processing speed.

A remarkable power saving effect can be obtained, in particular, in the wordprocessor or personal computer in which one operation is sequentially executed in response to each key entry from the user so that the activity factor of the CPU 1 or each of the peripheral devices is often only between several and tens or percentages.

Although the above embodiment has been described with reference to a case in which peripheral LSIs are static C-MOS devices, a similar effect can be obtained by providing the PC 5 with the capability of changing the clock frequency to the minimum operative value in lieu of stopping supply of clock to dynamic type LSI devices in which supply of clock cannot be stopped and by performing a control similarly to the above embodiment.

Although power consumption is suppressed by controlling the supply of clock to each LSI in the above mentioned embodiment, various capabilities which have been heretofore separately achieved by individual LSIs could have been incorporated into one LSI due to the recent advance in high integration of LSIs. It is hard to achieve an effective power saving by controlling supply of clock to such an LSI.

The power consumption of an LSI having a CPU, DMAC and SCC thereon can be suppressed by stopping supply of clock thereto only when the CPU, DMA and SCC are not simultaneously used.

In order to overcome this difficulty, an approach is proposed wherein a switch which individually controls the supply of clock is provided for each component in a LSI chip so that the switch is turned on or off in response to an external signal to the LSI. Such a switch can be easily formed from conventional semiconductor devices.

Sophisticated power consumption control can be also achieved depending upon the usage conditions of resources in highly integrated LSIs having various capabilities by adopting the above mentioned approach.

Another embodiment of the present invention will be described with reference to drawings.

Figure 8:
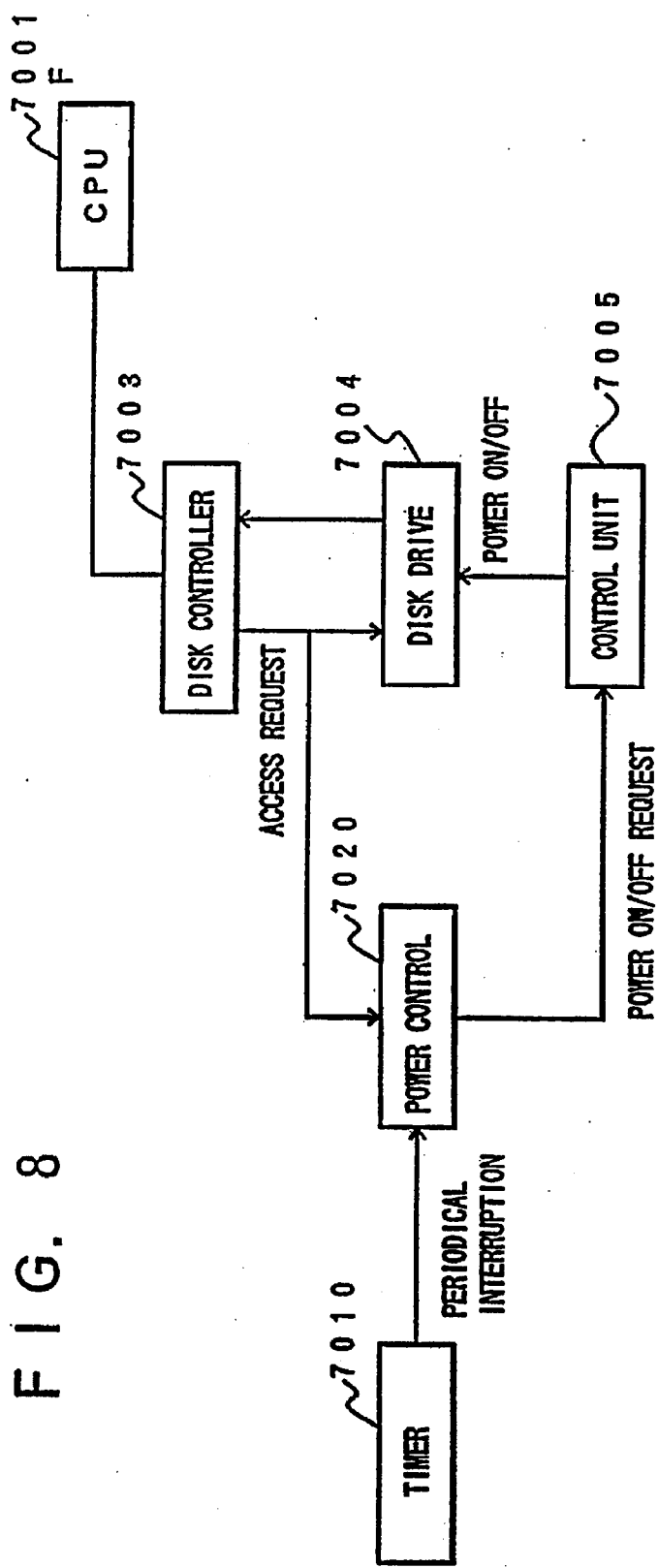
FIG. 8 is a block diagram showing the operation of power control processing.

Referring now to FIG. 8, there is shown a block diagram of the structure of an information processing system.

The information processing unit comprises a CPU 7001, a disk controller 7003, a disk drive 7004, a control unit 7005, a timer 7010, and a power control 7020.

The CPU 1 7001 performs processing of various data and controls the operation of the disk drive 7004 via the disk controller 7003.

The disk drive 7004 has the capability of storing various data. The power to the disk drive 7004 can be switched on or off by the control unit 7005. Although the disk drive 7004 is a floppy disk drive in the present embodiment, the disk drive 7004 is not limited to this and may be a device other than a disk drive.

The power control 7020 is periodically activated in response to an input from the timer 7010. When the power control 7020 is activated, it monitors an access request from the disk controller 7003 to the disk drive 7004 and detects the operating condition of the controller and has the capability of controlling the control unit 7005 in response to a detection result and information on the lapsed period of time which is input from the timer 7010. The control unit 7005 has the capability of turning on or off the power to the disk drive 7004 in response to an instruction from the power control 7020. The power control 7020 of the present embodiment has the capability of more effectively suppressing the consumed power by dynamically changing the period of time until the power to the disk drive 7004 is turned off depending the condition of access to the disk drive 7004.

The power control 7020 is not separately provided, but is implemented in a program stored in the CPU 7001 of the information processing system.

Figure 9:
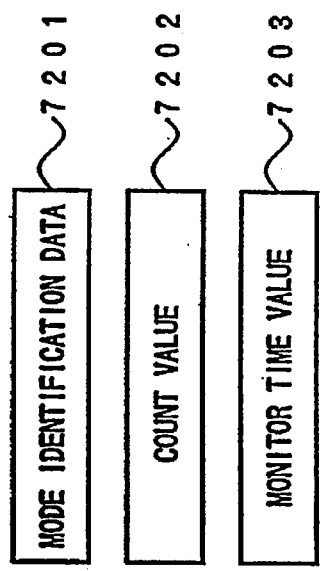
FIG. 9 is a block diagram showing the data structure.

The configuration of data which the power control 7020 uses therein is shown in FIG. 9.

The data comprises three fields such as mode identification data 7201, a count value 7202 and a monitor time value 7203.

The mode identification data 7201 represents which of a time measuring mode and a monitor mode, the power control 7020 is operating in.

The time measuring mode is a condition in which the power supply to the disk drive 7004 is turned off and the lapsed period of time (hereinafter referred to as OFF time) since the power supply is turned off is measured.

The monitor mode is a condition in which the power supply to the disk drive 7004 is turned on.

The count value 7202 is a reversible counter which in the time measuring mode is used as an up counter for counting the off time of the disk drive 7004 and in the monitoring mode is used as a down counter for indicating the remaining monitor time, that is, the remaining period of time until supply of power to the disk drive 7004 is turned off.

The monitor time 7203 indicates a lapsed period of time (hereinafter referred to as monitor time) until the supply of power to the disk drive 7004 is turned off after the disk drive is last accessed.

Although not shown in the drawings, other data such as a reference monitor time value which will be a reference of the monitor time, a maximum monitor time value which is a maximum value of the monitor time, a minimum monitor time value which is a minimum value of the monitor time, monitor time incremental or decremental value which is an increment or decrement by which the monitor time is increased or decreased respectively are provided.

Operation will now be described.

Figure 10:
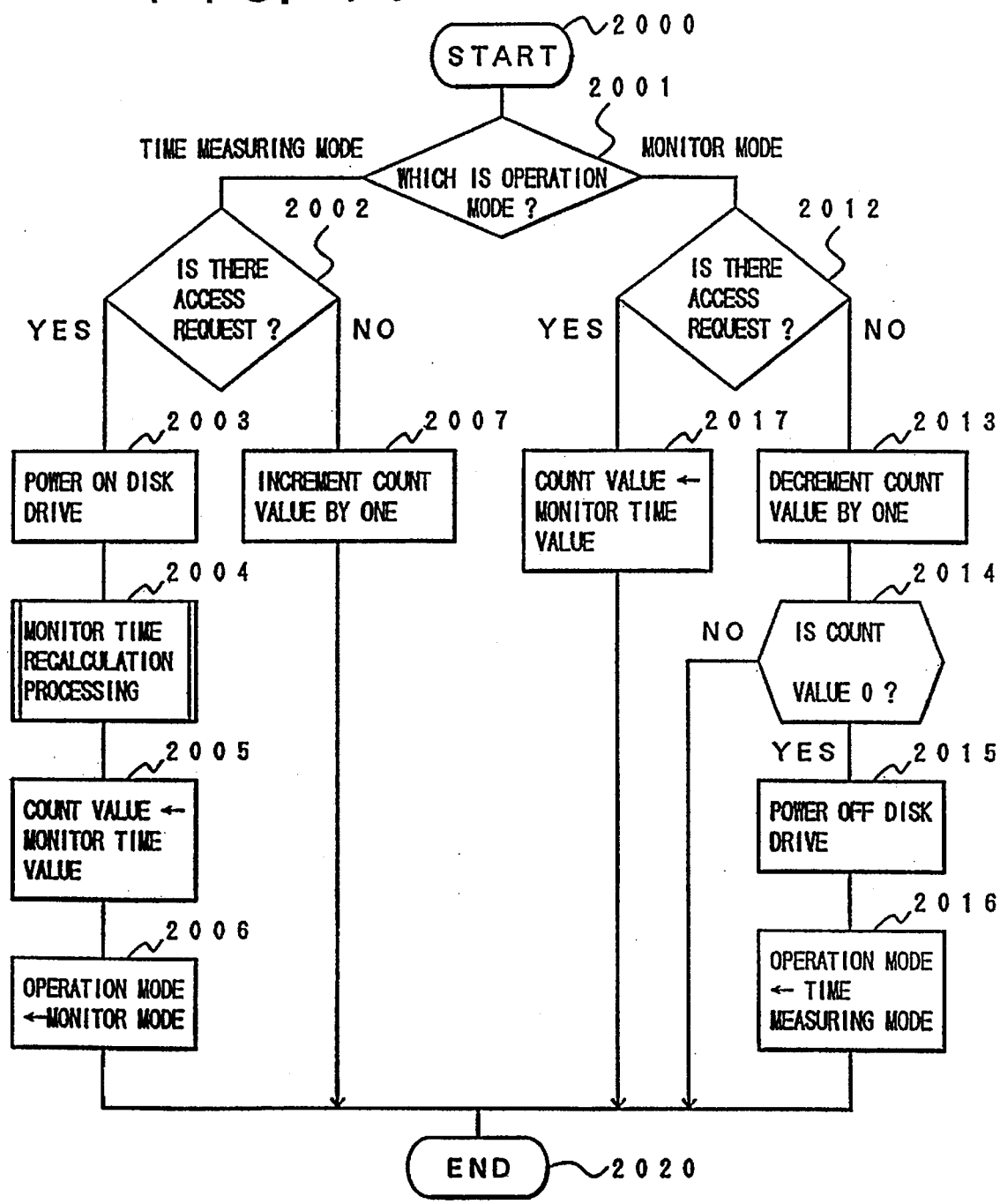
FIG. 10 is a flow chart showing power control processing steps.

FIG. 10 is a flow chart showing the operation of the power control 7020.

The power control 7020 is activated by the periodic interrupt from the timer 7010 (step 2000). If activated, the power control 7020 then checks the mode identification data 7201 to determine what the current operation mode is (step 2001). If the mode is the time measuring mode, the program will proceed to step 2002. Conversely, if the mode is the monitor mode, the program will proceed to step 2012.

In step 2002, the power control 7020 determines whether or not there was an access request form the disk controller 7003 to the disk drive 7004 during the time between the present time and the previous activation.

If there was no access, the count value 7202 is then incremented by one (step 2007) to terminate the processing (step 2020). Conversely, if there was an access, the control unit 7005 is controlled to turn on the power supply to the disk drive 7004 (step 2003). Subsequently, the monitor time recalculation processing is performed (step 2004). The monitor time recalculation processing will be described hereafter in detail.

After the monitor time recalculation processing, the power control 7020 presets the monitor time value 7203 based upon a value calculated by the monitor time recalculation processing and replaces the count value 7202 with the monitor time value 7203 (step 2005). Thereafter, the power control 7020 changes the mode identification data 7201 into the monitor mode (step 2006) to terminate the processing (step 2020).

If the mode is the monitor mode in step 2001, the program step will proceed to step 2012.

The power control 7020 determines whether or not there was an access request from the disk controller 7003 to the disk drive 7004 in the interval between the previous activation and the present time. If there was an access request, the power control replaces the count value 7202 with the monitor time value 7203 to initialize the count value 7202 (step 2017), and thereafter terminates the processing (step 2020).

If there was no access request, the power control decrements the count value 7202 by one (step 2013) and determines whether or not the count value 7202 is 0 (step 2014). If the count value 7202 is not 0, the program step will proceed to step 2020 and terminates the processing (step 2020). If the count value 7202 is 0, the power control controls the control unit 7005 to turn off the power supply to the disk drive 7004 (step 2015). The power control changes the content of the mode identification data 7201 into the time measuring mode from the monitor mode (step 2016) and then terminates the processing (step 2020).

Figure 11:
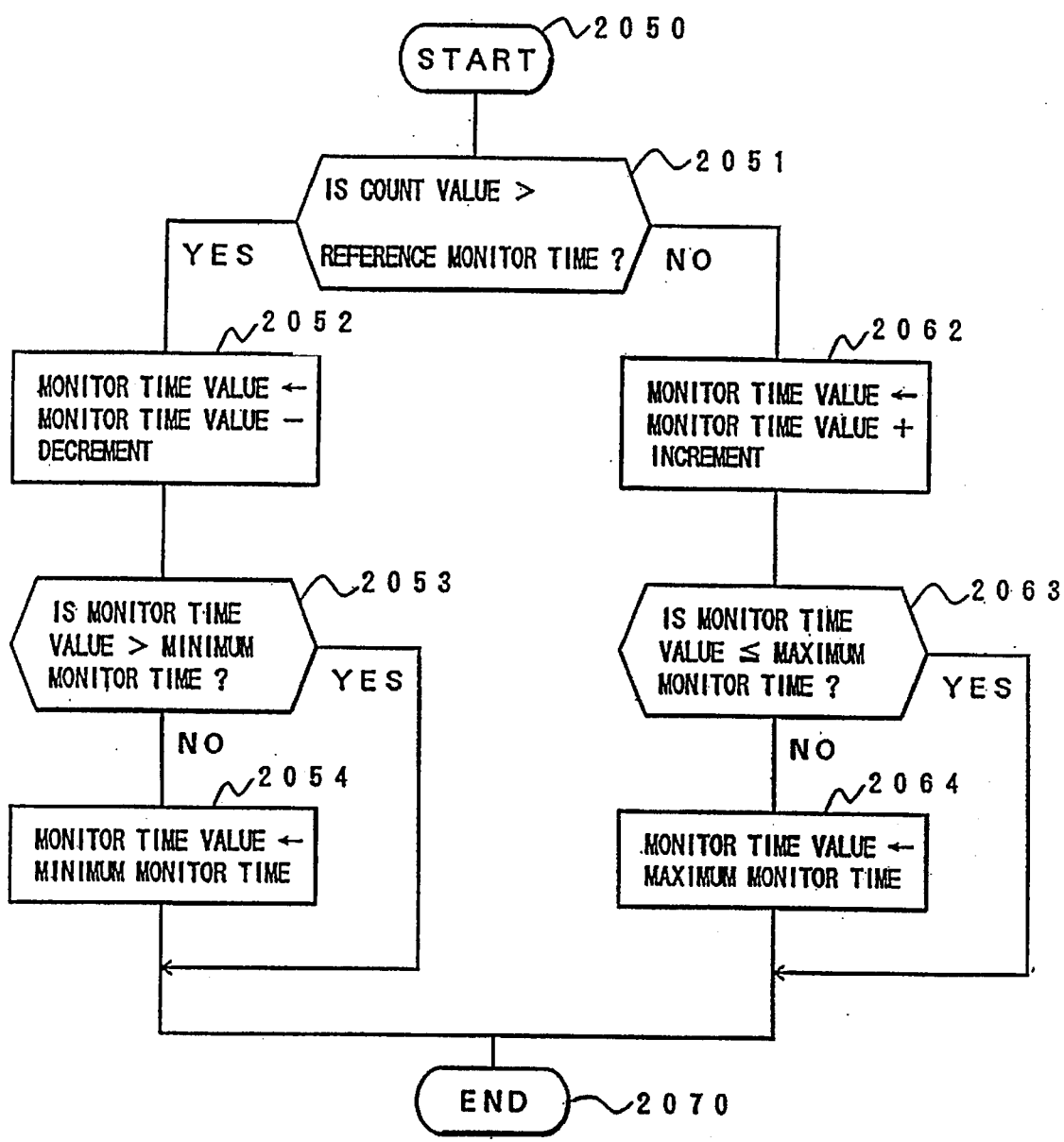
FIG. 11 is a flow chart showing the steps of recalculation processing during monitor time.

The above mentioned monitor time recalculation processing which is performed in step 2004 will be described with reference to FIG. 11.

The value which is represented by the count value 7202 at the time when the recalculation processing is performed is representative of the off time of the disk drive 7004, that is, the lapsed period of time until the present time since the supply of power to the disk drive 7004 is turned off.

Accordingly, after commencement of operation (step 2050), the power control 7020 compares the current count value 7202 with the reference monitor time value in step 2051. If the count value 7202 is larger than the monitor time value, the program step will proceed to step 2052. If smaller, the program step will proceed to step 2062.

The power control 7020 determines that the frequency of access to the disk drive 7004 is decreased since the count value 7202, that is, the off time is larger than the reference monitor time and decreases the monitor time value 7203 by the decreased value (step 2062). This shortens the monitor time so that the period of time until the supply of power to the disk drive 7004 is turned off is shortened.

Subsequently, the power control 7020 determines whether or not the value of the monitor time value 7203 is less than the minimum monitor time value (step 2053). If less, the power control replaces the monitor time value 7203 with the minimum monitor time value (step 2054) and terminates the processing (step 2070). Accordingly, the monitor time will not become shorter than the minimum time. If the value of the monitor time value 7203 is not less than the minimum monitor time value, the power control terminates the processing (step 2070).

If the power control 7020 determines that the counter value 7202 is less than the reference monitor time in step 2051, the program step will proceed to step 2062 as mentioned above.

The power control 7020 determines that the frequency of access to the disk drive 7004 is increased since the count value 7020, that is, the off time is less than the reference monitor time and increases the monitor time value 7203 by the increased value (step 2052). This extends the monitor time so that the period of time until the supply of power to the disk drive 7004 is turned off is extended.

Subsequently, the power control 7020 determines whether or not the value of the monitor time value 7203 is larger than the maximum monitor time value (step 2063). If larger, the power control replaces the monitor time value 7203 with the maximum monitor time value (step 2064) and terminates the processing (step 2070). Accordingly, the monitor time will not become longer than the maximum time. If the value of the monitor time value 7203 is not more than the maximum monitor time value, the power control terminates the processing (step 2070).

Thereafter, the program step will proceed to step 2005 shown in FIG. 10 and the processing is performed.

Although the reference monitor time, the minimum monitor time, the maximum monitor time, the incremented value of the monitor time, and the decremented value of the monitor time are set to 30 seconds, 5 seconds, 3 minutes, 15 seconds and 15 seconds, respectively, since a floppy disk drive is used as the disk drive 7004 in the present embodiment, these times are not limited to these values.

Figure 12:
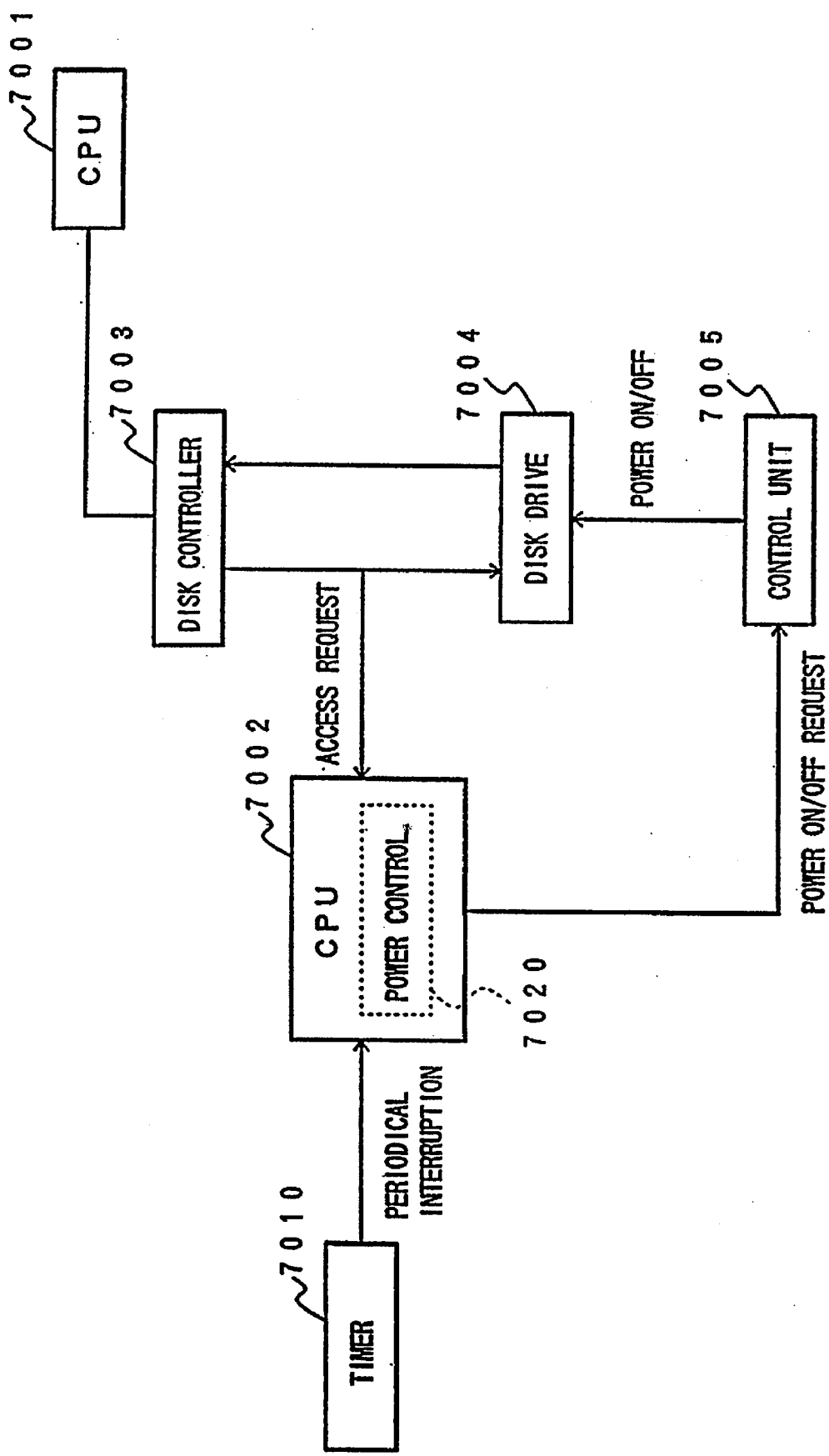
FIG. 12 is a block diagram showing the structure of another embodiment.

The power control 7020 may not be implemented by the program stored in the CPU 7001 and may be implemented by an exclusive CPU 7002 as shown in FIG. 12. Also in this case, the processing shown in FIGS. 9 to 11 can be performed without changing the program, etc. since it is completely independent of the other data processing.

The monitor time until the supply of power to the disk drive is dynamically changed depending upon the condition of access to the disk drive 7004 in the foregoing embodiment as mentioned above. Accordingly, the supply of power to the disk drive 7004 is turned off after the lapse of the monitor time which is shorter or longer if the access frequency is lower or higher, respectively. Thus, the power consumed by the disk drive 7004 can be suppressed without the power being frequently re-applied. The power control which has been described above is applicable to ordinary electronic equipment as well as the information processing system.

As mentioned above, in a first aspect of the present invention, supply of clock or power to respective hardware devices can be continued while they are in use and can be stopped while they are not used.

Accordingly, supply of power to the hardware devices which are not involved in the processing which is being executed by users can be stopped at any time even while the users actually use the information processing system. Thus, the power which is consumed by the whole of the information processing system can be suppressed to the minimum without having adverse effects on the processing speed.

In a second aspect of the present invention since an information processing system, a power source monitor and a disk drive apparatus, etc. change the period of time until the power source is turned on or off depending upon the operating condition of the apparatus, the power consumed by the apparatus can be effectively suppressed.

Application of both aspects of the present invention can cause power to be more effectively suppressed.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A power consumption control apparatus for an information processing apparatus having multi-tasking control means which executes a plurality of information processing operations in parallel by time-divisionally switching a plurality of tasks in an arithmetic processing unit, said power consumption control apparatus comprising:

means for detecting an event where there are no information processing operations to be executed;

means for setting said arithmetic processing unit to a power-saving mode in response to said event; and means for immediately clearing said power-saving mode set in said arithmetic processing unit in response to an interrupt signal from an input/output device.

2. A method for controlling power consumption for an information processing apparatus having multi-tasking control means which executes a plurality of information processing operations in parallel by time-divisionally switching a plurality of tasks in an arithmetic processing unit, said method comprising the steps of:

setting said arithmetic processing unit to a power-saving mode when there are no information processing operations to be executed; and immediately clearing said power-saving mode set in said arithmetic processing unit in response to an interrupt signal from an input/output device.

3. A power consumption control apparatus for an information processing apparatus having multi-tasking control means which executes a plurality of information processing operations in parallel by time-divisionally switching a plurality of tasks in an arithmetic processing unit, said power consumption control apparatus comprising:

means for detecting an event where there are no information processing operations to be executed;

means for stopping supply of a clock to said arithmetic processing unit or lowering a frequency of said clock in response to said event; and means for immediately resuming supply of said clock to said arithmetic processing unit or raising said frequency of said clock in response to an interrupt signal from an input/output device.

4. A method for controlling power consumption for an information processing apparatus having multi-tasking control means which executes a plurality of information processing operations in parallel by time-divisionally switching a plurality of tasks in an arithmetic processing unit, said method comprising the steps of:

stopping supply of a clock to said arithmetic processing unit or lowering a frequency of said clock when there are no information processing operations to be executed; and immediately resuming supply of said clock to said arithmetic processing unit or raising said frequency of said clock in response to an interrupt signal from an input/output device.

5. A power consumption control apparatus for an information processing apparatus having multi-tasking control means which executes a plurality of information processing operations in parallel by time-divisionally in switching a plurality of tasks an arithmetic processing unit, said power consumption control apparatus comprising:

means for detecting an event where there are no information processing operations to be executed;

means for stopping, by said arithmetic processing unit, supply of a clock to said arithmetic processing unit in response to said event, wherein said arithmetic processing unit executes an arithmetic processing command to halt said arithmetic processing unit thereby placing said arithmetic processing unit in a pause status; and means for immediately learning that said arithmetic processing unit is in said pause status in response to an interrupt signal from an input/output device.

6. A method for controlling power consumption for an information processing apparatus having multi-tasking control means which executes a plurality of information processing operations in parallel by time-divisionally switching a plurality of tasks in an arithmetic processing unit, said method comprising the steps of:

stopping, by said arithmetic processing unit, supply of a clock to said arithmetic processing unit in response to said event and executing an arithmetic processing command to halt said arithmetic processing unit thereby placing said arithmetic processing unit in a pause status, when there are no information processing operations to be executed; and immediately clearing said pause status of said arithmetic processing unit in response to an interrupt signal from an input/output device.

7. An information processing apparatus comprising:

an arithmetic processing unit for executing an information processing operation;

multi-tasking control means for executing a plurality of information processing operations in parallel by time-divisionally switching a plurality of tasks in said arithmetic processing unit; and a power consumption control apparatus which comprises:
  means for detecting an event where there are no information processing operations to be executed,
  means for setting said arithmetic processing unit to a power-saving mode in response to said event, and
  means for immediately clearing said power-saving mode set in said arithmetic processing unit in response to an interrupt signal from an input/output device.

8. An information processing apparatus comprising:

an arithmetic processing unit for executing an information processing operation;

multi-tasking control means for executing a plurality of information processing operations in parallel by time-divisionally switching a plurality of tasks in said arithmetic processing unit; and a power consumption control apparatus which comprises:
  means for detecting an event where there are no information processing operations to be executed,
  means for stopping supply of a clock to said arithmetic processing unit or lowering a frequency of said clock in response to said event, and
  means for immediately resuming supply of a clock to said arithmetic processing unit or raising said frequency of said clock in response to an interrupt signal from an input/output device.

9. An information processing apparatus, comprising:

an arithmetic processing unit for executing an information processing operation;

multi-tasking control means for executing a plurality of information processing operations in parallel by time-divisionally switching a plurality of tasks in said arithmetic processing unit; and a power consumption control apparatus which comprises:
  means for detecting an event where there are no information processing operations to be executed,
  means for stopping, by said arithmetic processing unit, supply of a clock to said arithmetic processing unit in response to said event, wherein said arithmetic processing unit executes an arithmetic processing command to halt of a job being performed by said arithmetic processing unit thereby placing said arithmetic processing unit in a pause status, and
  means for immediately clearing said pause status of said arithmetic processing unit in response to an interrupt signal from an input/output device.

* * * * *